(12) United States Patent
Tsujino et al.

(10) Patent No.: US 8,867,848 B2
(45) Date of Patent: Oct. 21, 2014

(54) DISPLAY TEST DEVICE, DISPLAY TEST METHOD, AND STORAGE MEDIUM

(75) Inventors: Kenichi Tsujino, Kawasaki (JP); Hideki Sawano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 694 days.

(21) Appl. No.: 12/821,320

(22) Filed: Jun. 23, 2010

(65) Prior Publication Data

US 2010/0329573 A1 Dec. 30, 2010

(30) Foreign Application Priority Data

Jun. 26, 2009 (JP) ................................ 2009-152765

(51) Int. Cl.
*G06K 9/62* (2006.01)
*G09G 3/00* (2006.01)

(52) U.S. Cl.
CPC ............ *G09G 3/006* (2013.01); *G09G 9/00463* (2013.01); *G09G 9/62* (2013.01); *G09G 9/3266* (2013.01)
USPC ........... 382/216; 382/118; 382/165; 382/234; 382/278; 382/309; 345/428; 345/581

(58) Field of Classification Search
USPC ................. 382/216, 309, 118, 165, 234, 278; 345/581, 428
See application file for complete search history.

(56) References Cited

U.S. PATENT DOCUMENTS

| | | | | |
|---|---|---|---|---|
| 4,916,435 A * | 4/1990 | Fuller | .......................... | 340/573.4 |
| 6,008,836 A * | 12/1999 | Bruck et al. | .................. | 725/131 |
| 6,370,274 B1 * | 4/2002 | Peters et al. | .................. | 382/234 |
| 6,853,980 B1 * | 2/2005 | Ying et al. | .................. | 705/26.62 |
| 6,954,288 B2 * | 10/2005 | Uekusa et al. | ................. | 358/1.9 |
| 7,073,207 B2 * | 7/2006 | Kim | ................. | 2/195.1 |
| 7,305,436 B2 * | 12/2007 | Willis | .......................... | 709/204 |
| 7,375,523 B1 * | 5/2008 | Hancu | .......................... | 324/307 |
| 7,868,941 B2 * | 1/2011 | Honda | ..................... | 348/333.05 |
| 7,895,293 B1 * | 2/2011 | Vasilik | .......................... | 709/218 |
| 8,073,207 B2 * | 12/2011 | Ayaki et al. | .................... | 382/118 |
| 8,115,769 B1 * | 2/2012 | Lymer et al. | ................... | 345/440 |
| 8,115,789 B2 * | 2/2012 | Kirihara et al. | ............... | 345/698 |

(Continued)

FOREIGN PATENT DOCUMENTS

| | | |
|---|---|---|
| JP | 10-124431 | 5/1998 |
| JP | 11-250054 | 9/1999 |
| JP | 2006-309535 | 11/2006 |

OTHER PUBLICATIONS

Japanese Office Action issued Jun. 4, 2013 in corresponding Japanese Patent Application No. 2009-152765.

*Primary Examiner* — Vu Le
*Assistant Examiner* — Aklilu Woldemariam
(74) *Attorney, Agent, or Firm* — Staas & Halsey LLP

(57) ABSTRACT

A display test apparatus includes a determination information storage unit that stores a determination information for use in determining correctness of content displaying, a file acquisition unit that acquires a file, a content image creation unit that creates an image of content to be displayed on the basis of the file, a content image analysis unit that analyzes a displaying of the content on the basis of the image of content, a determination unit that determines whether the content is correctly displayed on the basis of the determination information and a result of the analysis by the content image analysis unit, and an output unit that outputs a determination result information indicating a result of the determination by the determination unit.

20 Claims, 40 Drawing Sheets

(56) References Cited

U.S. PATENT DOCUMENTS

| | | | |
|---|---|---|---|
| 8,169,545 B2* | 5/2012 | Suzuki | 348/584 |
| 8,239,489 B1* | 8/2012 | Vasilik | 709/218 |
| 2001/0043349 A1* | 11/2001 | Bobrow et al. | 358/1.12 |
| 2003/0001956 A1* | 1/2003 | Harshbarger et al. | 348/189 |
| 2003/0016865 A1* | 1/2003 | Lopez et al. | 382/165 |
| 2003/0016942 A1* | 1/2003 | Tojo et al. | 386/46 |
| 2003/0023638 A1* | 1/2003 | Weight | 707/526 |
| 2003/0179298 A1* | 9/2003 | Akiyama et al. | 348/222.1 |
| 2003/0231241 A1* | 12/2003 | Iida | 348/207.99 |
| 2005/0034065 A1* | 2/2005 | Weight | 715/513 |
| 2005/0175260 A1* | 8/2005 | Takahashi | 382/309 |
| 2006/0071920 A1* | 4/2006 | Ishimatsu et al. | 345/204 |
| 2007/0097139 A1* | 5/2007 | Chen et al. | 345/581 |
| 2007/0100653 A1* | 5/2007 | Ramer et al. | 705/1 |
| 2008/0055494 A1* | 3/2008 | Cernasov | 349/12 |
| 2008/0165191 A1* | 7/2008 | Kirihara et al. | 345/428 |
| 2008/0211825 A1* | 9/2008 | Sunakawa et al. | 345/581 |
| 2008/0278770 A1* | 11/2008 | Sakuramata et al. | 358/448 |
| 2009/0055494 A1* | 2/2009 | Fukumoto | 709/206 |
| 2009/0092107 A1* | 4/2009 | Cai et al. | 370/338 |
| 2010/0082431 A1* | 4/2010 | Ramer et al. | 705/14.52 |
| 2010/0092107 A1* | 4/2010 | Mochizuki et al. | 382/309 |

* cited by examiner

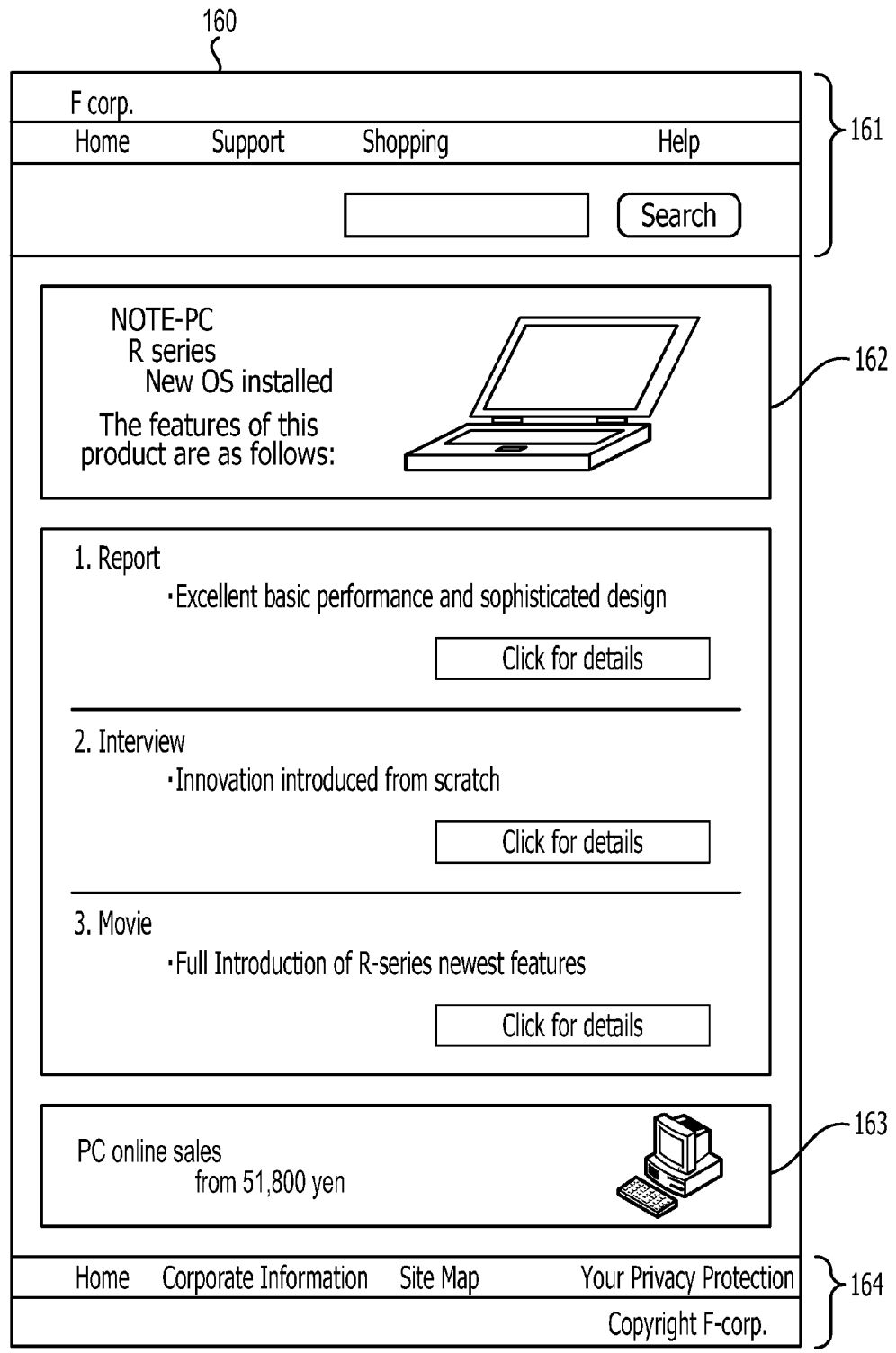

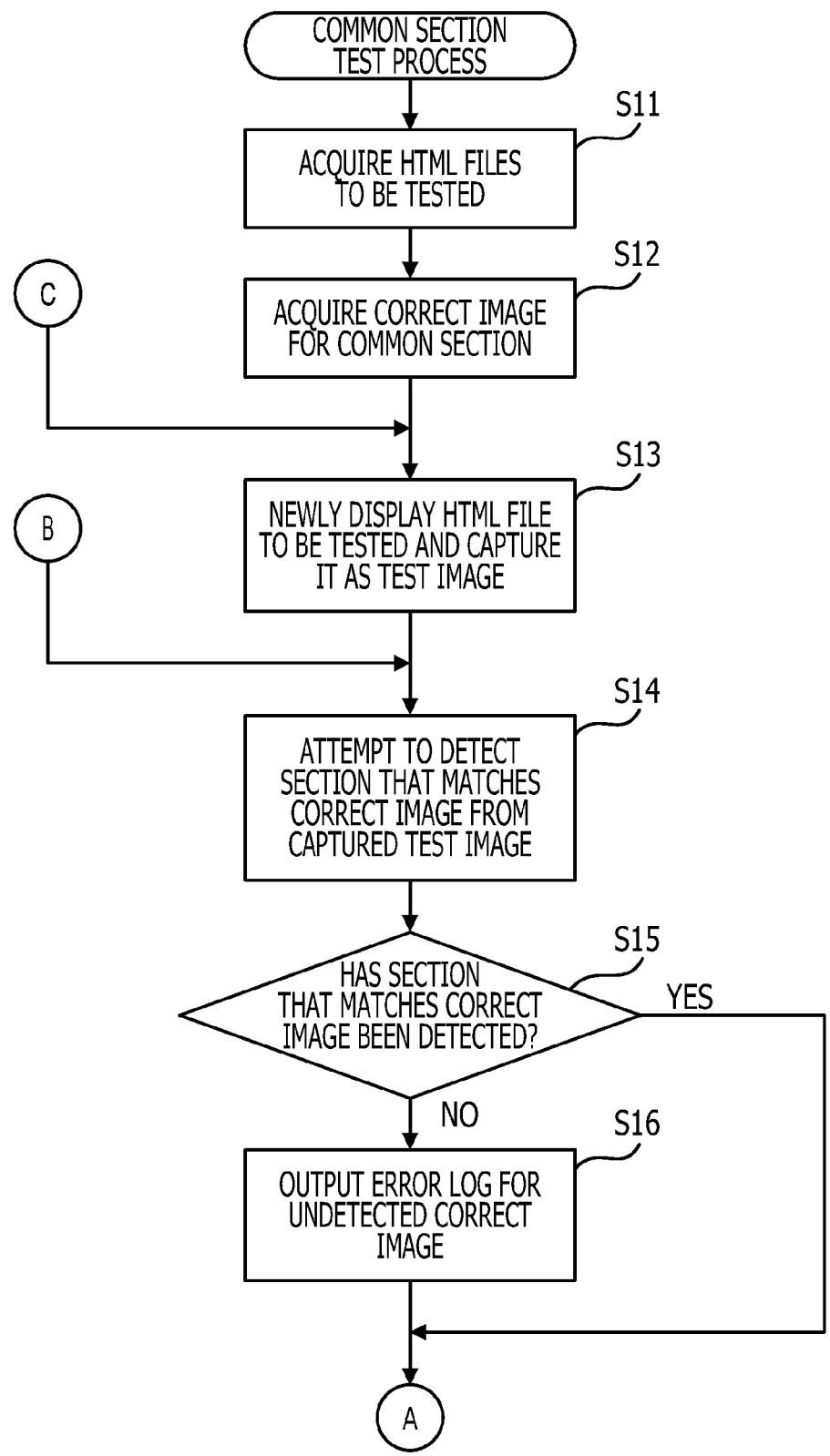

- No header is displayed (Not found).
  page URL:http://work...co.jp/biz/mv/
  file:\biz\mv\index.html

- The header is displaced rightward by 2 dots.
  page URL:http://work...co.jp/biz/mv/
  file:\biz\mv\index.html

- The alt display element do not match the HTML source.
  page   URL:http://work...co.jp/biz/mv/
  file:\biz\mv\index.html
  line 86
Displayed text: Product: Product information on business PC
Correct text: Product: Product information on work station

- The alt display element seems not to match the image.
  Please check.
  page   URL:http://work...co.jp/biz/mv/
  file:\biz\mv\index.html
line 508
<img src="gazo.gif" alt="Dseries" ... >

- An image that is not displayed exists.
  Page URL:http://work...co.jp/biz/mv/
  file:\biz\mv\index.html
  line173
  <img src="/biz/mv/index/notebook-r.gif" alt="R series" width="275" height="55">

· No reference image is displayed.
 The page may have different layout or may be disorganized in displaying.
 page URL:http://work...co.jp/biz/mv/esp/001/
 file:\biz\mv\esp\001\index.html

· No reference image is displayed.
 The page may have different layout or may be disorganized in displaying.
 page URL:http://work...co.jp/biz/mv/esp/001/
 file:\biz\mv\esp\001\index.html

- The page length is too long.
  Please check whether the layout is disorganized.

page URL:http://work...co.jp/biz/mv/esp/001/
  file:\biz\mv\esp\001\index.html

- The page length is too short.
  Please check syntax.

Page URL:http://work...co.jp/biz/mv/esp/001/
  file:\biz\mv\esp\001\index.html

- The blank space size is too large.
  Please check whether the layout is disorganized.

page URL:http://work...co.jp/biz/mv/esp/001/
  file:\biz\mv\esp\001\index.html

⋮

ACQUIRE SOURCE CODE

<img src="gazo.gif" alt="PC online sales from 51,800 yen" ... >

DISPLAY TEST DEVICE, DISPLAY TEST METHOD, AND STORAGE MEDIUM

CROSS-REFERENCE TO RELATED APPLICATIONS

This application is based upon and claims the benefit of priority from the prior Japanese Patent Application No. 2009-152765 filed on Jun. 26, 2009, the entire contents of which are incorporated herein by reference.

FIELD

Embodiments relate to a display test apparatus, a display test method, and a storage medium that stores a display test program.

BACKGROUND

Typically, contents published on the Internet or the like, such as web pages, include a plurality of images and text and are made of hypertext markup language (HTML) files in which source data for displaying the images and text is described. One example method of determining whether such an HTML file is correctly displayed on a browser is an automatic syntax check on source data of html files. Another checking method is visual verification by actually displaying web pages using html files on a browser and visually testing them by an operator or a person who handles test.

A method of checking syntax of source data of an HTML file detects a syntax error of source data. With this check method, even if there is no syntax error, an HTML file that would be poorly displayed when being actually displayed may be unable to be found.

In this case, such an HTML file is detectable using visual verification by displaying it on a screen through a browser and testing it. In renewing an enormous number of web pages forming a web site, newly creating all web pages from scratch is rare. For such a renewal, new web pages (HTML files) are often created by automatic conversion based on a large number of existing HTML files using a conversion tool.

Unfortunately, even in this case, an operator must inspect displaying through a browser after automatic conversion of a large number of web pages using a tool. If the number of pages to be tested reaches tens of thousands, for example, human visual verification needs much time and effort in checking all pages. Such a visual verification task has a problem because repeated simple large-volume operations for many hours typically reduce working efficiency and cause human fatigue and this may induce an operator to make a mistake.

SUMMARY

According to an embodiment, a display test apparatus includes a determination information storage unit that stores a determination information for use in determining correctness of content displaying, a file acquisition unit that acquires a file, a content image creation unit that creates an image of content to be displayed based on the file; a content image analysis unit that analyzes a displaying of the content based on the image of content, a determination unit that determines whether the content is correctly displayed based on the determination information and a result of the analysis by the content image analysis unit, and an output unit that outputs a determination result information indicating a result of the determination by the determination unit.

An object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 relates to test of a header and a footer according to an embodiment;

FIG. 6 is a flowchart that illustrates example operations for a common section test process according to an embodiment;

FIGS. 27A and 27B illustrate error logs in a common section test process according to an embodiment;

FIGS. 28A and 28B illustrate error logs in the alternative text test process according to an embodiment;

FIG. 29 illustrates an error log in the image absence test process according to an embodiment;

FIGS. 30A and 30B illustrate error logs in a layout test process according to an embodiment;

FIGS. 31A and 31B illustrate error logs in a page length test process according to an embodiment;

FIG. 32 illustrates an error log in a blank space size test process according to an embodiment;

DETAILED DESCRIPTION

Figure 1:
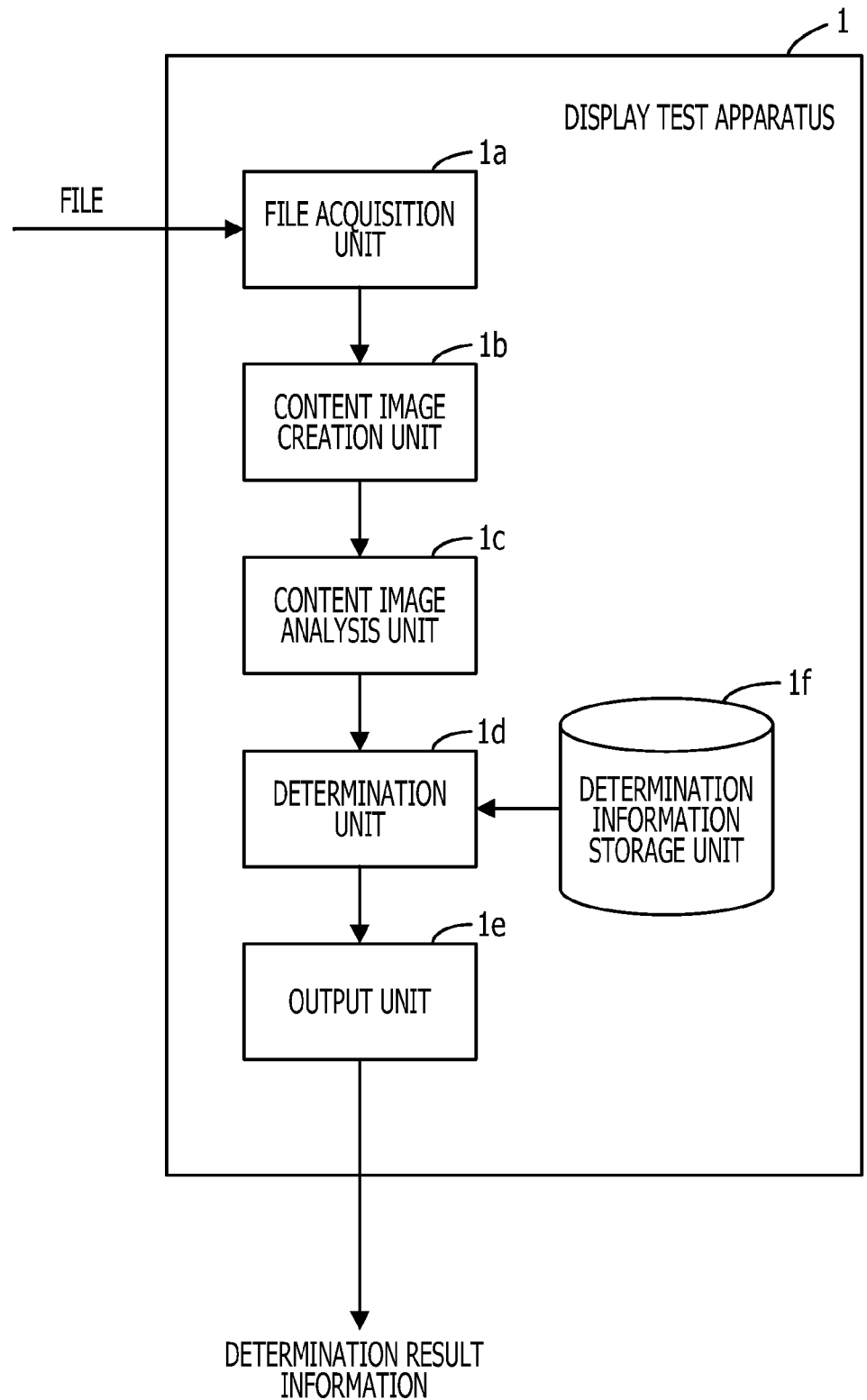
FIG. 1 illustrates an embodiment.

Reference will now be made in detail to the embodiments, examples of which are illustrated in the accompanying drawings, wherein like reference numerals refer to the like elements throughout. The embodiments are described below to explain the present invention by referring to the figures.

Embodiments are described below with reference to the drawings.

FIG. 1 illustrates an embodiment. A display test apparatus 1 illustrated in FIG. 1 inspects content displaying. The display test apparatus 1 includes a file acquisition unit 1a, a content image creation unit 1b, a content image analysis unit 1c, a determination unit 1d, an output unit 1e, and a determination information storage unit 1f.

The file acquisition unit 1a acquires a file, such as an HTML file, for use in displaying a content, for example, web pages being a target for test. The content image creation unit 1b creates a content image based on the file acquired by the file acquisition unit. The content image creation unit 1b creates a content image corresponding to all or part of the content as a target for test. While HTML is described as an example, the present invention is not limited to any particular type of file.

The content image analysis unit 1c analyzes displaying of a content on the basis of a content image created by the content image creation unit 1b. The determination unit 1d determines whether a content is correctly displayed on the basis of determination information stored in the determination information storage unit 1f and a result of analysis conducted by the content image analysis unit 1c. An example of the determination is comparison between determination information and a result of analysis.

The output unit 1e outputs determination result information indicating a result of determination by the determination unit 1d. This enables a person who handles test of a content to identify the result of the determination. The determination information storage unit 1f stores determination information for use in determining whether a content is correctly displayed on the basis of a file.

With the display test apparatus 1, the file acquisition unit 1a acquires a file. The content image creation unit 1b creates a content image based on the file. The content image analysis unit 1c analyzes displaying of the content on the basis of the content image created by the content image creation unit 1b. The determination unit 1d determines whether the content is correctly displayed on the basis of determination information stored in the determination information storage unit 1f and a result of the analysis conducted by the content image analysis unit 1c. The output unit 1e outputs determination result information indicating a result of the determination by the determination unit 1d.

With this, content displaying is automatically tested. According to an embodiment, correctness of display of content may be determined based on various conditions including set standards common to display of similar content, prescribed by a user, etc.

An embodiment is described next.

Figure 2:
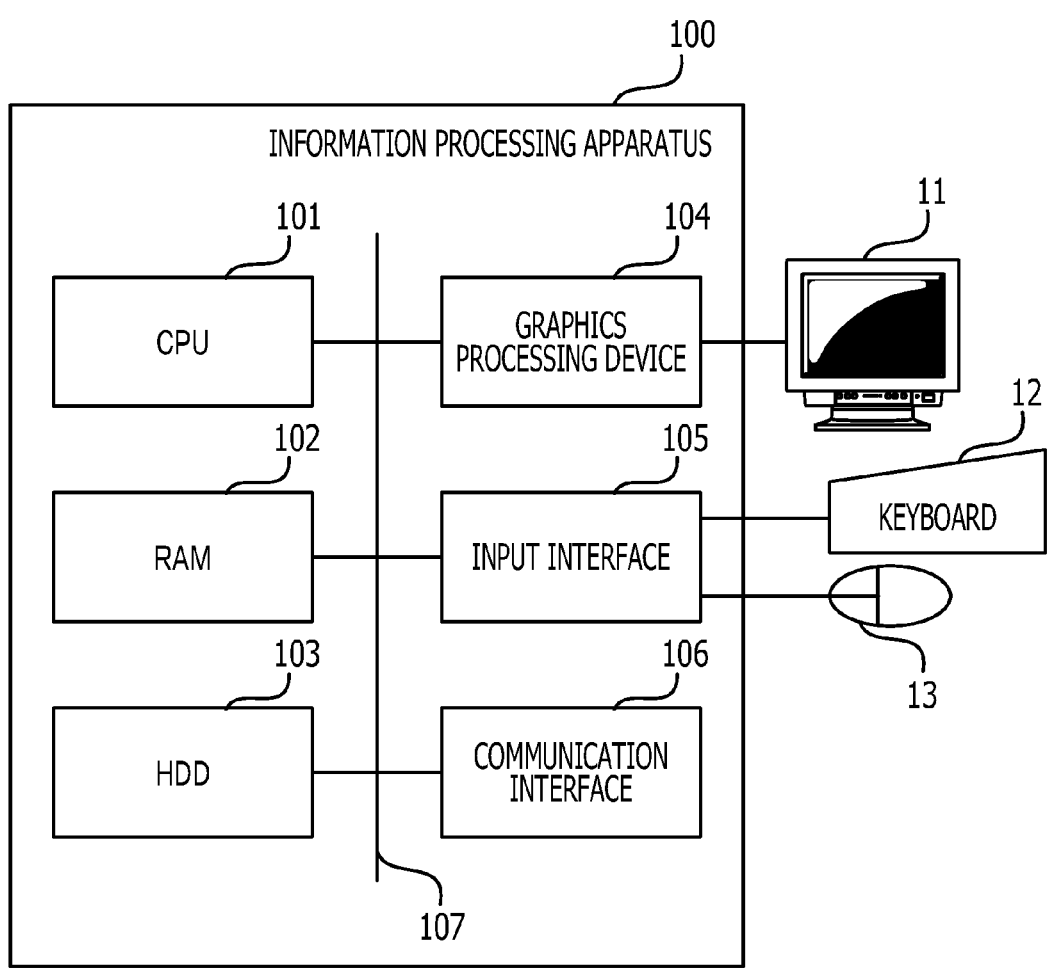
FIG. 2 illustrates a hardware configuration of an information processing apparatus according to an embodiment.

FIG. 2 illustrates a hardware configuration of an information processing apparatus according to an embodiment. In an information processing apparatus 100 illustrated in FIG. 2, a central processing unit (CPU) 101 exerts control over the apparatus. The CPU 101 is connected to a random-access memory (RAM) 102, a hard disk drive (HDD) 103, a graphics processing device 104, an input interface 105, and a communication interface 106 with a bus 107 disposed therebetween.

The RAM 102 temporarily stores at least part of an operating system (OS) and application software programs to be executed by the CPU 101. The RAM 102 stores various kinds of data required for processing performed by the CPU 101. The HDD 103 stores the OS and application programs in a nonvolatile manner.

The graphics processing device 104 is connected to a monitor 11. In response to an instruction from the CPU 101, the graphics processing device 104 displays an image on the screen of the monitor 11. The input interface 105 is connected to an input device, such as a key board 12 and a mouse 13. The input interface 105 transmits a signal supplied from the key board 12 or mouse 13 to the CPU 101 through the bus 107.

The communication interface 106 is connectable to a network (not illustrated). The communication interface 106 enables exchange data with other computers over the network.

Figure 3:
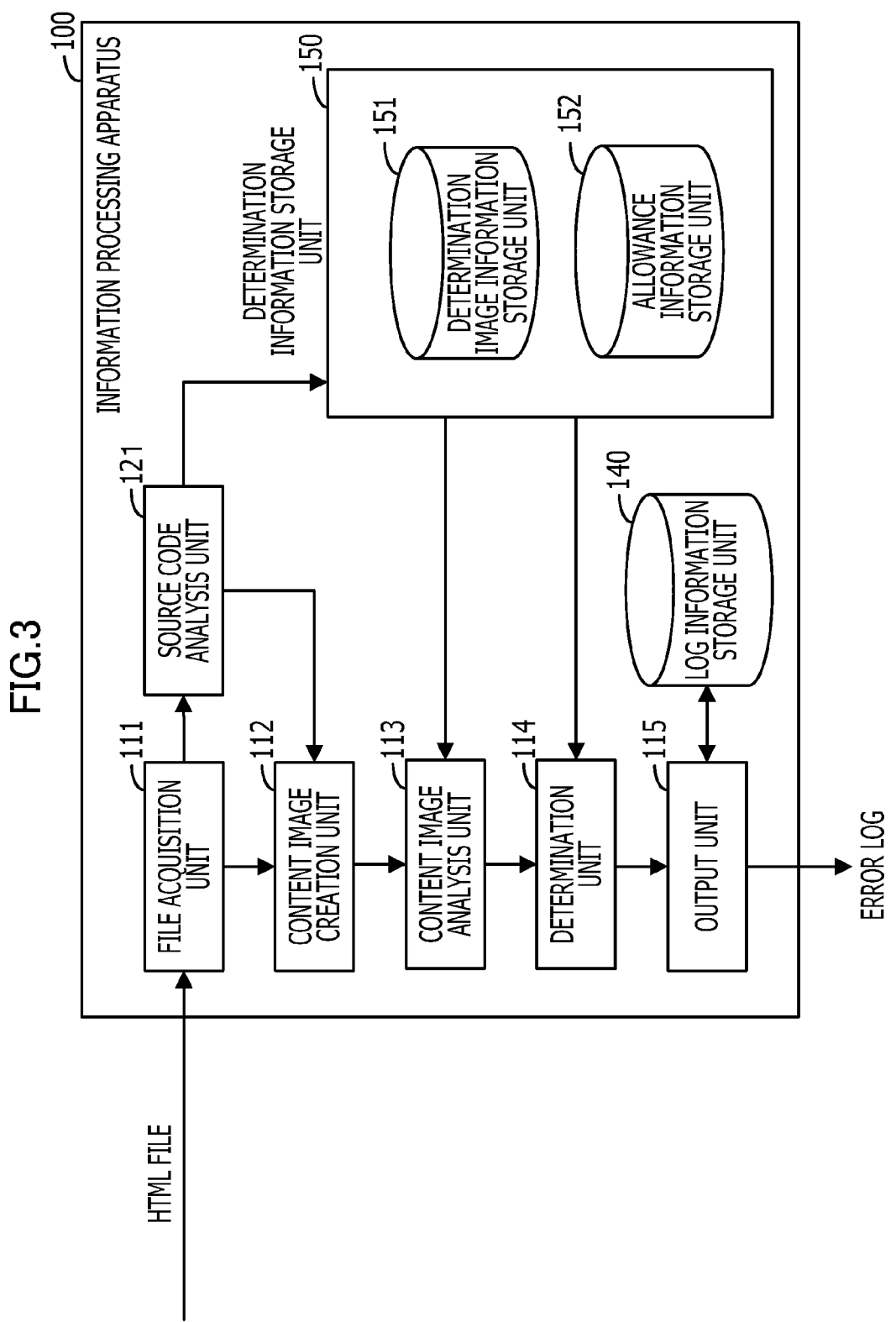
FIG. 3 is a block diagram that illustrates a configuration of an information processing apparatus according to an embodiment.

The above-described hardware configuration achieves processing functions of an embodiment. FIG. 3 is a block diagram that illustrates a configuration of the information processing apparatus according to an embodiment. The information processing apparatus 100 illustrated in FIG. 3 has the display testing function of testing displaying of a content. The information processing apparatus 100 includes a file acquisition unit 111, a content image creation unit 112, a content image analysis unit 113, a determination unit 114, an output unit 115, a source code analysis unit 121, a log information storage unit 140, and a determination information storage unit 150. The determination information storage unit 150 includes a determination image information storage unit 151 and an allowance information storage unit 152.

The information processing apparatus 100 according to an embodiment performs, on web pages being test-target contents, a common section test process, an alternative text test process, an image absence test process, a layout test process, a page length test process, and a blank space size test process to carry out test. At this time, a tester of web pages can carry out any necessary test process on the web pages by operating the information processing apparatus 100. A tester also can make the information processing apparatus 100 automatically carry out all test processes on web pages.

The file acquisition unit 111 acquires an HTML file, for example, for use in displaying web pages being test-target contents. This file includes source code. An image tag in the source code identifies an image to be displayed. The alt attribute of the image tag specifies text to be displayed as an alternative for this image. This alternative displaying is also called alt displaying.

The content image creation unit 112 creates a content image to be displayed on the basis of a file acquired by the file acquisition unit 111. The content image creation unit 112 creates a content image of all or part of a content as a test target.

The content image creation unit 112 creates an image for test (hereinafter referred to also as a test image) so that a content is actually displayed on the basis of a file on the screen of the monitor 11 through a browser or the like. The content image creation unit 112 creates an alternative text display image being a content when alternative text is displayed on the basis of a file and an alternative text non-display image being a content when alternative text is not displayed. The content image creation unit 112 creates alternative text image information indicating an alternative text image displayed when the alt attribute effectively functions in content displaying by extracting the difference between the created alternative text display image and alternative text non-display image.

The content image analysis unit 113 analyzes content displaying on the basis of a content image created by the content image creation unit 112. The content image analysis unit 113 acquires display image position information indicating the position of an image that has the same substance as a correct image and that is displayed within a test image on the basis of correct image information included in determination information stored in the determination information storage unit 150. The content image analysis unit 113 extracts character information from alternative text image information and generates recognized text information. The content image analysis unit 113 attempts to extract, from a test image, a display image that has the same substance as a correct image and that is displayed in the test image.

The content image analysis unit 113 measures a length of a page of a test image and generates display page length information. The content image analysis unit 113 displays an image on the basis of image identifying information included in determination information stored in the determination information storage unit 150 and generates image size information indicating the measured size of that display image. The content image analysis unit 113 generates expected page length information indicating an expected length of a page of a content on the basis of the generated image size information and display character count information included in the determination information.

The content image analysis unit 113 acquires display image position information indicating the position of a display image that has the same substance as a reference image and that is displayed in a test image on the basis of reference image information included in the determination information stored in the determination information storage unit 150.

The content image analysis unit 113 calculates a size of blank space in a test image and generates display blank space size information. The content image analysis unit 113 generates expected blank space size information indicating an expected size of blank space in a content on the basis of the generated image size information and display character count information included in the determination information.

The determination unit 114 determines whether the content is correctly displayed by, for example, comparing the determination information and the result of analysis on the basis of determination information stored in the determination information storage unit 150 and a result of analysis conducted by the content image analysis unit 113.

The determination unit 114 compares correct image position information included in determination information stored in the determination information storage unit 150 and display image position information acquired by the content image analysis unit 113 and determines whether the position of the display image is normal. For example, when the comparison indicates a mismatch of position information, the determination unit 114 determines that the position of the display image is abnormal.

The determination unit 114 compares correct text information included in determination information stored in the determination information storage unit 150 and recognized text information generated by the content image analysis unit 113. When there is a mismatch between the correct text information and the recognized text information, the determination unit 114 determines that alt display elements do not match.

When the display image is not extracted from the test image by the content image analysis unit 113, the determination unit 114 determines that the display image is absent. The determination unit 114 compares display page length information and expected page length information generated by the content image analysis unit 113 and determines whether the page length is normal. For example, the determination unit 114 determines the difference between the display page length information and the expected page length information. When that difference is outside an allowable range set on the basis of page length allowance information included in the determination information, the determination unit 114 determines that the display page length of the content is abnormal.

The determination unit 114 compares reference image position information included in determination information stored in the determination information storage unit 150 and display image position information acquired by the content image analysis unit 113 and determines whether the display position of the reference image is normal. For example, the determination unit 114 determines displacement between the position in the reference image position information and that in the display image position information. When that displacement is outside an allowable range set on the basis of displacement allowance information included in the determination information, the determination unit 114 determines that the position at which the reference image is displayed is abnormal.

The determination unit 114 compares display blank space size information and expected blank space size information generated by the content image analysis unit 113 and determines whether the blank space size is normal. For example, the determination unit 114 determines the difference between the blank space size information and the expected blank space size information. When that difference is outside an allowable range set on the basis of blank space size allowance information included in the determination information, the determination unit 114 determines that the display blank space size is abnormal.

The output unit 115 outputs an error log that indicates a result of determination by the determination unit 114. This enables a tester of contents to identify the result of determination. The output unit 115 may cause the log information storage unit 140 to store the error log and may read the error log from the log information storage unit 140 and output it in response to a request from a tester.

The source code analysis unit 121 extracts, from source code of a file, information that indicates an alt display element of a display image to be displayed in a content and causes the determination image information storage unit 151 to store the extracted information as correct text information.

The source code analysis unit 121 extracts, from a source code of a file, image identifying information for identifying a display image to be displayed in a content and text information that indicates text to be displayed. After that, the source code analysis unit 121 counts the number of characters of the text to be displayed in the content on the basis of the extracted text information and generates display character count information indicating the counted number of characters. Then, the source code analysis unit 121 causes the determination image information storage unit 151 to store determination information including the extracted image identifying information and the generated display character count information.

The log information storage unit 140 stores error logs that indicate results of determination by the determination unit 114. Examples of the error logs include abnormality of the position of a display image in a web page, mismatching between alt display elements, absence of a display image, abnormality of the display page length of a content, abnormality of the position at which a reference image is displayed, and abnormality of the display blank space size of a content.

The determination information storage unit 150 stores determination information for use in determining whether a content is correctly displayed on the basis of a file. Examples of the determination information include correct image information, correct image position information, image identifying information, and display character count information. The correct image information indicates a correct image that should be included in a content. The correct image position information indicates the position at which the correct image should be displayed. The image identifying information is information for use in testing the page length being the length by which the content is actually displayed on a display screen. The display character count information indicates the number of characters counted by the content image analysis unit 113. Other examples of the determination information include reference image information, reference image position information, and image identifying information. The reference image information indicates a reference image included in a content for use in testing the content for disorganized layout. The reference image position information indicates the position at which the reference image should be displayed. The image identifying information is information for use in testing the blank space size of the content.

The allowance information storage unit 152 stores page length allowance information, position allowance information, and blank space size allowance information. The page length allowance information sets an allowable range for a page length. The position allowance information sets an allowable range for displacement between the position at which the reference image should be displayed and the position at which the reference image is actually displayed in the content. The blank space size allowance information sets an allowable range for a blank space size being the size of blank space when the content is actually displayed on a display screen.

Figure 5A:
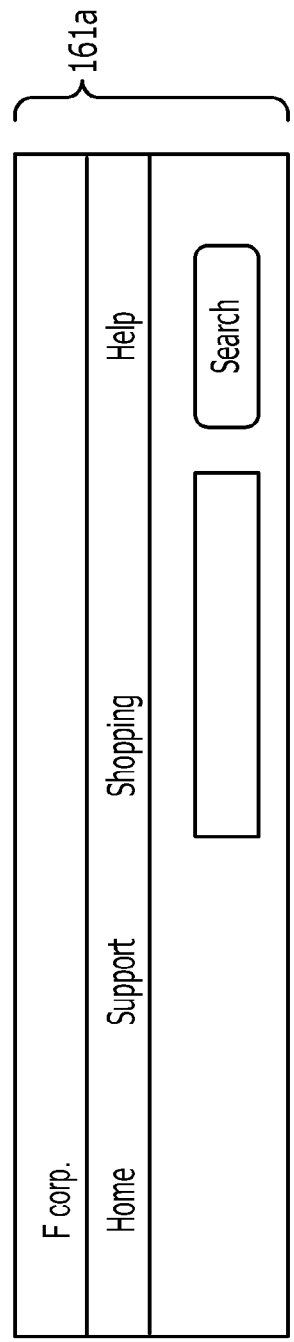
FIGS. 5A and 5B relate to test of a header and a footer according to an embodiment.
Figure 5B:

Processes performed in an embodiment are described next. FIGS. 4, 5A, and 5B relate to test of a header and a footer according to an embodiment. An HTML file display image 160 illustrated in FIG. 4 is the one in which a web page being a test-target content is displayed on the basis of an HTML file and its displayed result is captured as an image. The HTML file display image 160 includes a header 161, display images 162 and 163, and a footer 164.

With an embodiment, the use of a common section test process described below enables a section common to a plurality of web pages to be collectively tested. The common section may be the header 161 and the footer 164, for example. According to an embodiment, a plurality of elements having substantially similar elements across various pages may be tested using the same image file.

For an embodiment, prior to the common section test process, information that indicates a correct image for a common section (e.g., a header correct image 161a illustrated in FIG. 5A or a footer correct image 164a illustrated in FIG. 5B) and information that indicates coordinates at which the correct image should be displayed in a web page are prepared aside from the HTML file display image 160, which is a test target. These prepared information indicating the correct image and information indicating the coordinates of the correct image are stored as determination information in the determination image information storage unit 151. Then, in the common section test process, the HTML file display image 160, which is a test target, is compared with the correct image to determine whether the test target includes the correct image and the position of the correct image is correct. When the determination in the common section test process indicates the occurrence of the above error, an error log is output.

Figure 7:
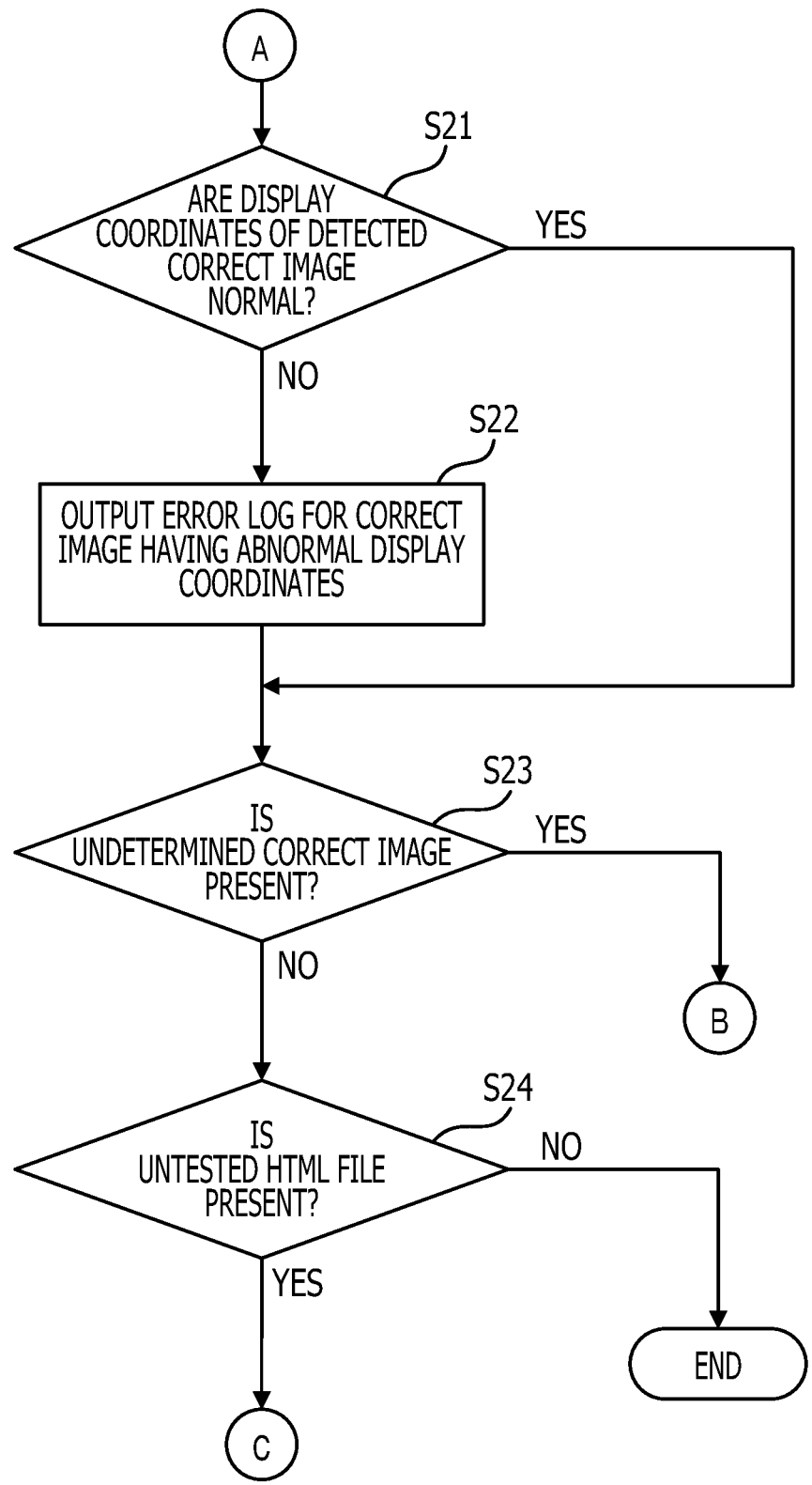
FIG. 7 is a flowchart that illustrates example operations for a common section test process according to an embodiment.

FIGS. 6 and 7 are flowcharts that illustrate example operations for the common section test process according to an embodiment. The common section test process illustrated in FIGS. 6 and 7 is the process of testing a common section to a plurality of pages in test-target web pages. The common section may be a header and a footer, for example. The present invention is not however limited to having a common section limited to a header and a footer. For example, an element which is to be displayed on one page may be identified by a user to be common across other selected pages. The common section test process is started in response to operation by a tester of contents, for example.

The file acquisition unit 111 acquires data of HTML files for web pages being test-target contents (S11). The content image analysis unit 113 acquires correct image information that indicates a correct image for a common section in the HTML files for the test-target web pages acquired by the file acquisition unit 111 from the determination image information storage unit 151 included in the determination information storage unit 150 (S12).

The content image creation unit 112 selects one from among untested HTML files for untested test-target web pages acquired by the file acquisition unit 111 and displays the selected HTML file for the web page. Then, the content image creation unit 112 captures the displayed result as a test image (S13).

The content image analysis unit 113 attempts to detect a section that matches the correct image in the test image (S14). The determination unit 114 determines whether the section matching the correct image has been detected from the test image as a result of the detection by the content image analysis unit 113 (S15).

When the determination unit 114 determines that no section matching the correct image has been detected (NO in S15), the output unit 115 outputs an error log that indicates that no correct image for the common section has been detected from the test-target HTML file (S16). In an embodiment, a predetermined number of unmatched elements (features) determined at operation S15 may not result in an error log but instead indicate a partial match within a range previously indicated as acceptable (normal).

When determining that the section matching the correct image has been detected (YES in S15), the determination unit 114 determines whether the display coordinates of that section in the test image are normal (S21).

Here, when the display coordinates of the section matching the correct image in the test image are within a predetermined allowable range with respect to predetermined coordinates, the determination unit 114 determines that those display coordinates are normal (YES in S21). The predetermined coordinates may be the coordinates of the upper left corner of the correct image, for example. The predetermined allowable range may be a displacement within ±10 dots from the coordinates of the upper left corner of the correct image on a display screen vertically and horizontally. In contrast, when the display coordinates of the section matching the correct image in the test image are outside the predetermined allowable range for the predetermined coordinates, the determination unit 114 determines that those display coordinates are abnormal (NO in S21).

The output unit 115 outputs an error log indicating that the display coordinates of the correct image are abnormal for the test-target HTML file (S22). The determination unit 114 determines whether there is an undetermined correct image in the HTML file being tested (S23). When there is an undetermined correct image (YES in S23), the above-described process is repeated for the HTML file being tested.

The determination unit 114 determines whether there is an untested HTML file (S24). When there is an untested HTML file (YES in S24), the above-described process is repeated for the untested HTML file. When there is no untested HTML file (NO in S24), the process ends.

Figure 8A:
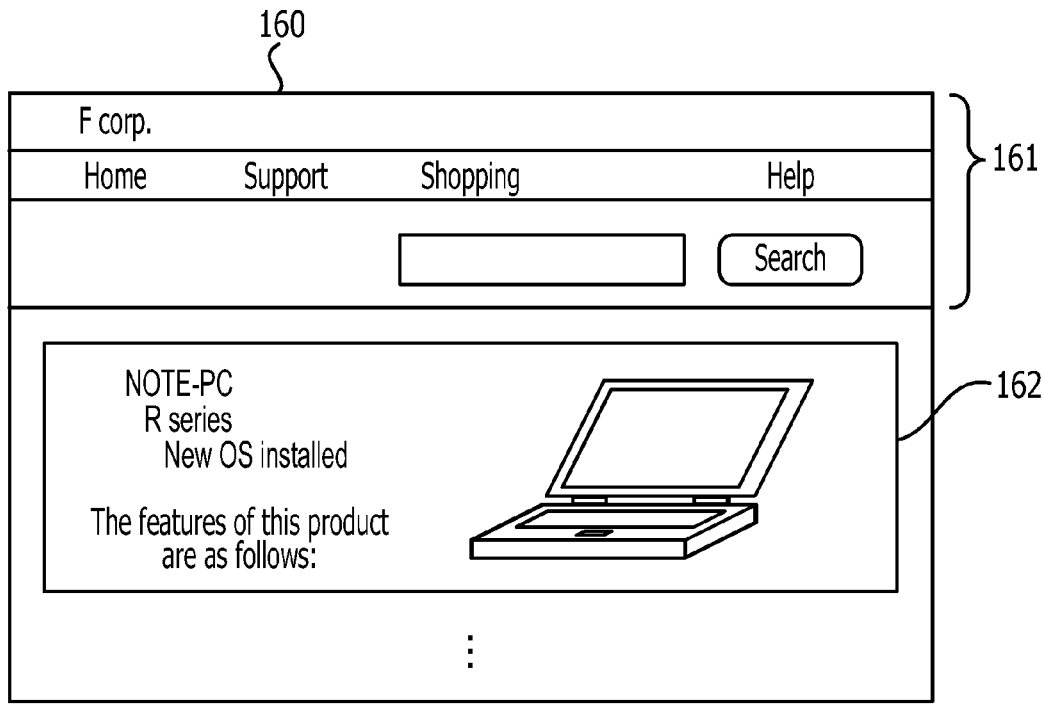
FIGS. 8A and 8B relate to test of alternative text according to an embodiment.
Figure 8B:
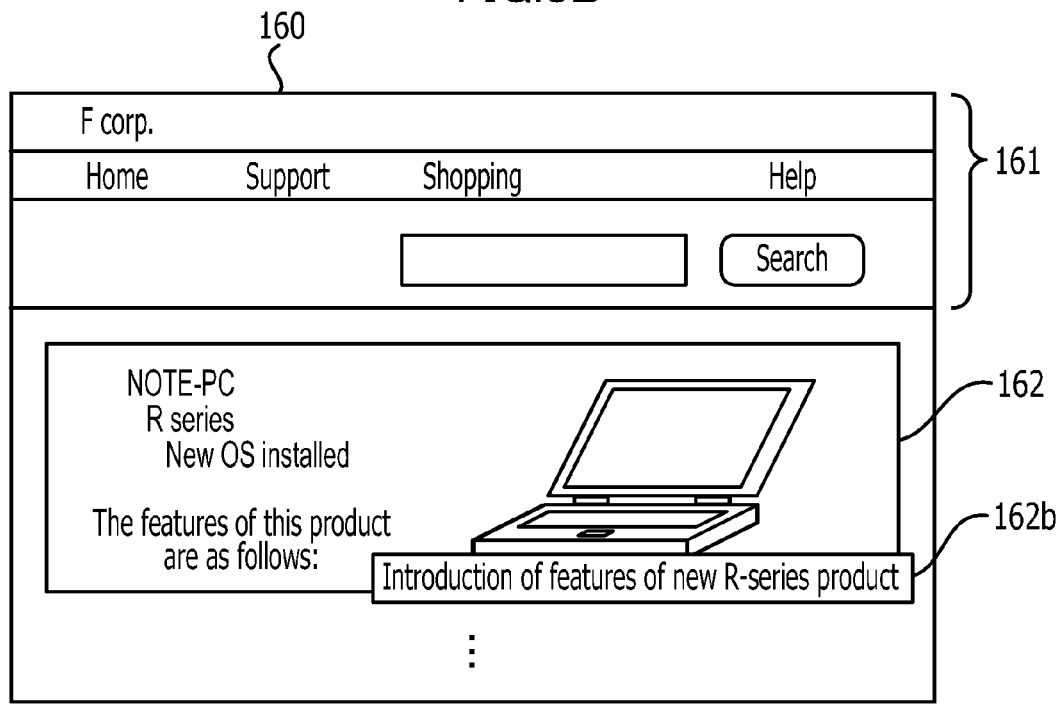
Figure 9:
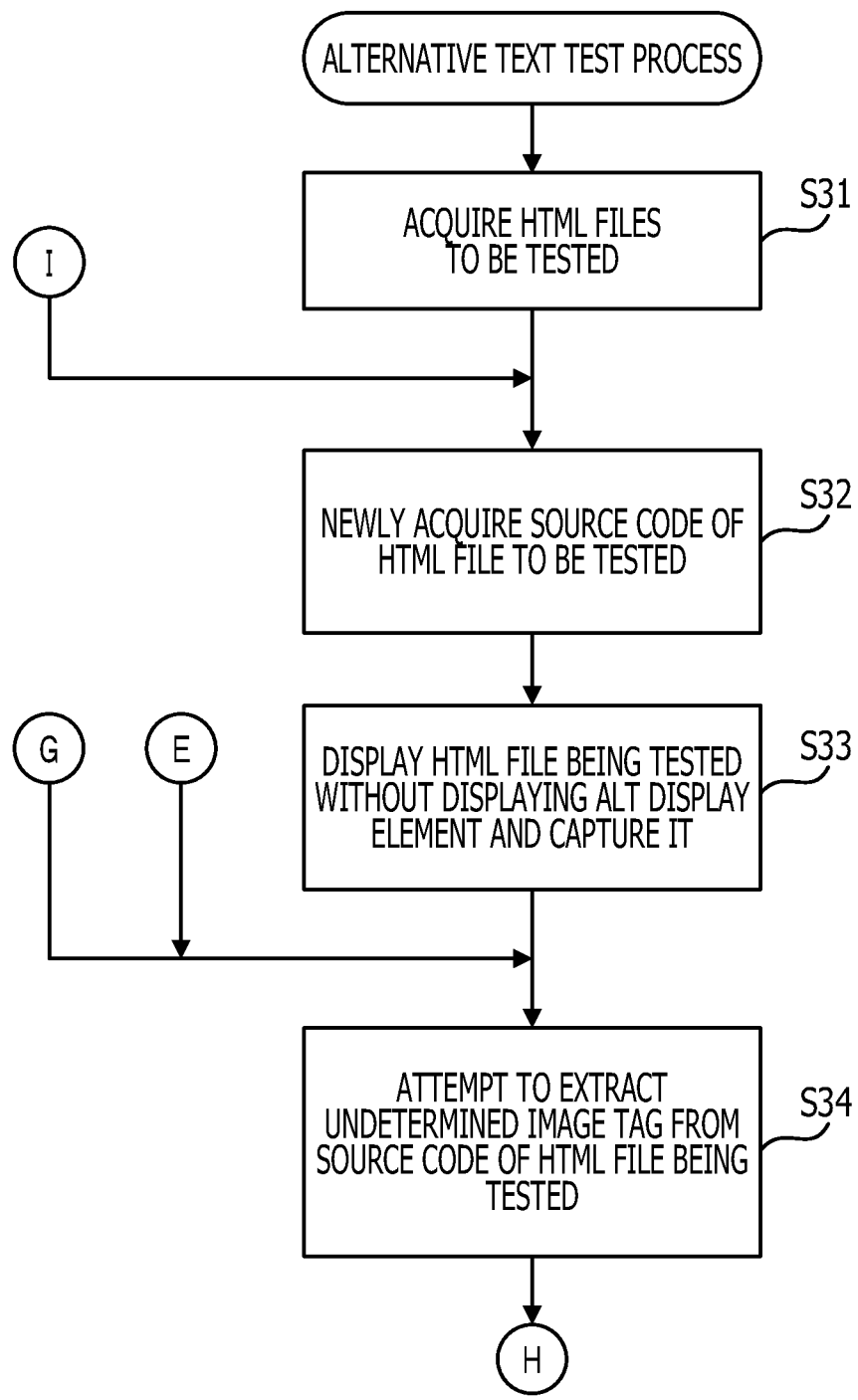
FIG. 9 is a flowchart that illustrates example operations for an alternative text test process according to an embodiment.
Figure 10:
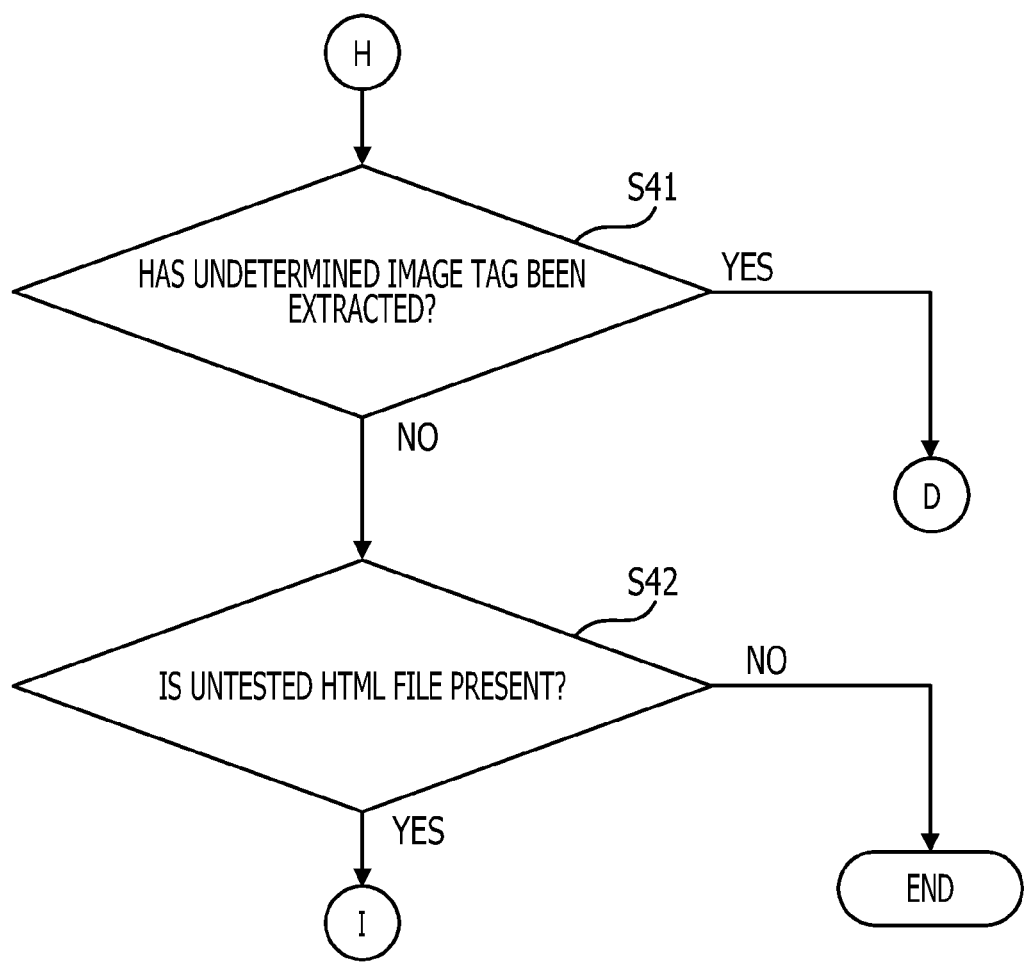
FIG. 10 is a flowchart that illustrates example operations for the alternative text test process according to an embodiment.
Figure 11:
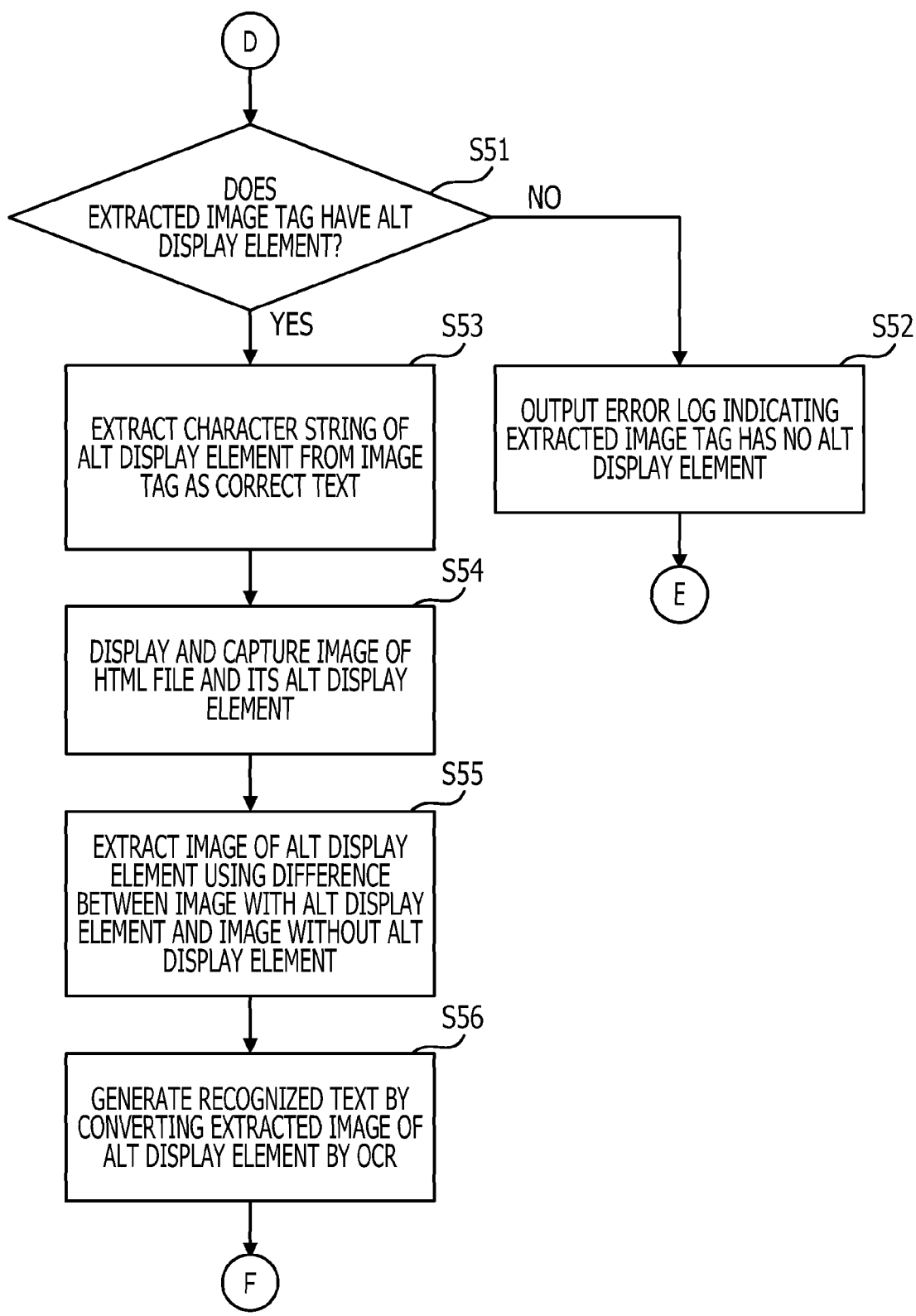
FIG. 11 is a flowchart that illustrates example operations for the alternative text test process according to an embodiment.
Figure 12:
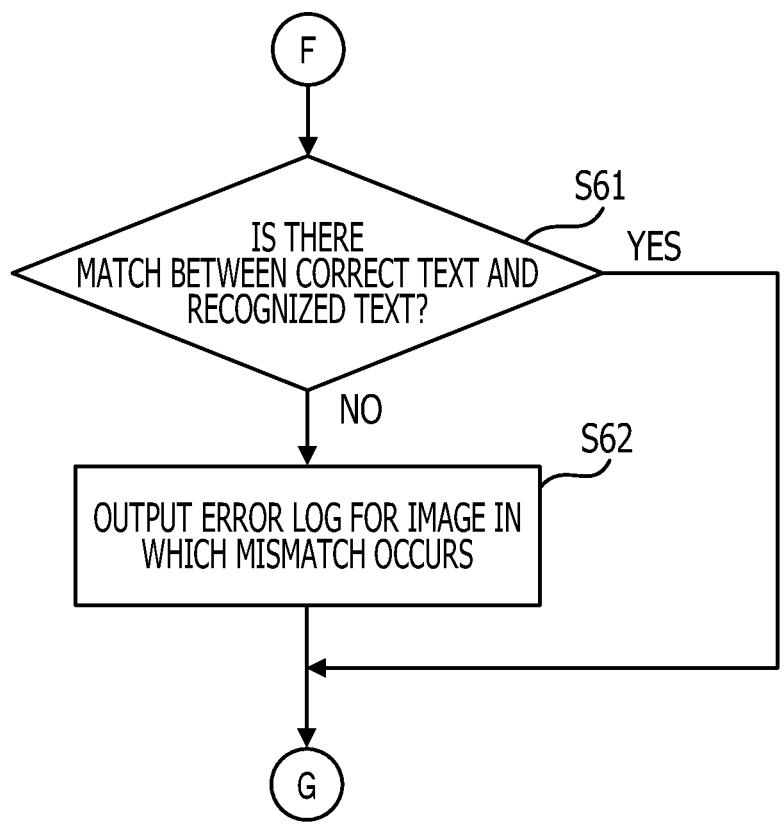
FIG. 12 is a flowchart that illustrates example operations for the alternative text test process according to an embodiment.

FIGS. 8A and 8B relate to test of alternative text according to an embodiment. The HTML file display image 160 illustrated in FIGS. 8A and 8B is the one in which a web page being a test-target content is displayed on the basis of the HTML file and the displayed result is captured as an image, as in FIGS. 4 and 5.

The HTML file display image 160 illustrated in FIG. 8A is the one in which, in displaying a web page being a test-target content on the basis of the HTML file, a display result occurring when alternative text (alt display element) for the display image 162 is not displayed is captured as an image.

The HTML file display image 160 illustrated in FIG. 8B is the one in which, in displaying a web page being a test-target content on the basis of the HTML file, a display result occurring when alternative text for the display image 162 is displayed in the event that, for example, the display image 162 is not displayed is captured as an image.

For an embodiment, with an alternative text test process described below, an alt display element is extracted on the basis of displayed results occurring when the alt display element of the display image 162 included in the content is displayed and not displayed, and it is determined whether the extracted alt display element is being correctly displayed. When the determination by the alternative text test process indicates that the alt display element is not being correctly displayed, an error log is output.

FIGS. 9 to 12 are flowcharts that illustrate example operations for the alternative text test process according to an embodiment. The alternative text test process illustrated in FIGS. 9 to 12 is the process of testing an alt display element of a display image displayed on the basis of an HTML file in a test-target web page, the process being performed by the information processing apparatus 100. The alternative text test process is started in response to an operation conducted by a tester of contents, for example.

The file acquisition unit 111 acquires data of Html files for test-target web pages (S31). The source code analysis unit 121 selects one from among the test-target web pages acquired by the file acquisition unit 111 and acquires source code of the HTML file (S32).

The content image creation unit 112 displays a web page based on the selected HTML file without displaying an alt display element. The content image creation unit 112 captures the displayed result as an alternative text non-display image (S33).

The content image analysis unit 113 attempts to extract, from the source code of the web page acquired by the source code analysis unit 121, an image tag corresponding to an undetermined display image (S34).

The determination unit 114 determines whether an image tag corresponding to an undetermined display image has been extracted from the HTML file being tested (S41).

When determining that no image tag corresponding to an undetermined display image (NO in S41), the determination unit 114 determines whether there is an untested HTML file (S42). When the determination unit 114 determines that there is no untested HTML file (NO in S42), the process in an embodiment ends. When the determination unit 114 determines that there is an untested HTML file (YES in S42), the source code analysis unit 121 acquires source code of the untested HTML file, as previously described, and the above-described process is performed.

When determining that there is an image tag corresponding to an undetermined display image (YES in S41), the determination unit 114 determines whether there is an alt display element corresponding to the image tag extracted by the content image analysis unit 113 (S51).

When the determination unit 114 determines that there is no alt display element (NO in S51), the output unit 115 outputs an error log indicating that there is no image tag corresponding to the alt display element extracted from the test-target HTML file (S52). After that, the content image analysis unit 113 attempts to extract an image tag corresponding to an undetermined display image, as previously described, and the above-described process is performed.

When the determination unit 114 determines that there is an alt display element (YES in S51), the source code analysis unit 121 extracts, from the image tag, a character string of the alt display element as correct text (S53). Then, the source code analysis unit 121 causes the determination image information storage unit 151 to store the extracted correct text.

The content image creation unit 112 displays the HTML file for the selected web page selected by the source code analysis unit 121 together with the alt display element. Then, the content image creation unit 112 captures the displayed result as an alternative text display image (S54).

The content image analysis unit 113 compares the alternative text non-display image being an image of a web page having no alt display element and the alternative text display image being an image in a web page that has an alt display element, both the images being captured by the content image creation unit 112, and extracts the difference obtained by the comparison as an image corresponding to the alt display element section (S55).

The content image analysis unit 113 generates recognized text in which the extracted image of the alt display element is converted into text by optical character recognition (OCR).

The determination unit 114 determines whether the correct text extracted by the source code analysis unit 121 and the recognized text generated by the content image analysis unit 113 match each other (S61).

When the determination unit 114 determines that the correct text and the recognized text do not match (NO in S61), the output unit 115 outputs an error log indicating that the correct text and the recognized text for the alt display element of the display image extracted from the image tag in source code of the test-target HTML file do not match (S62).

Figure 13A:
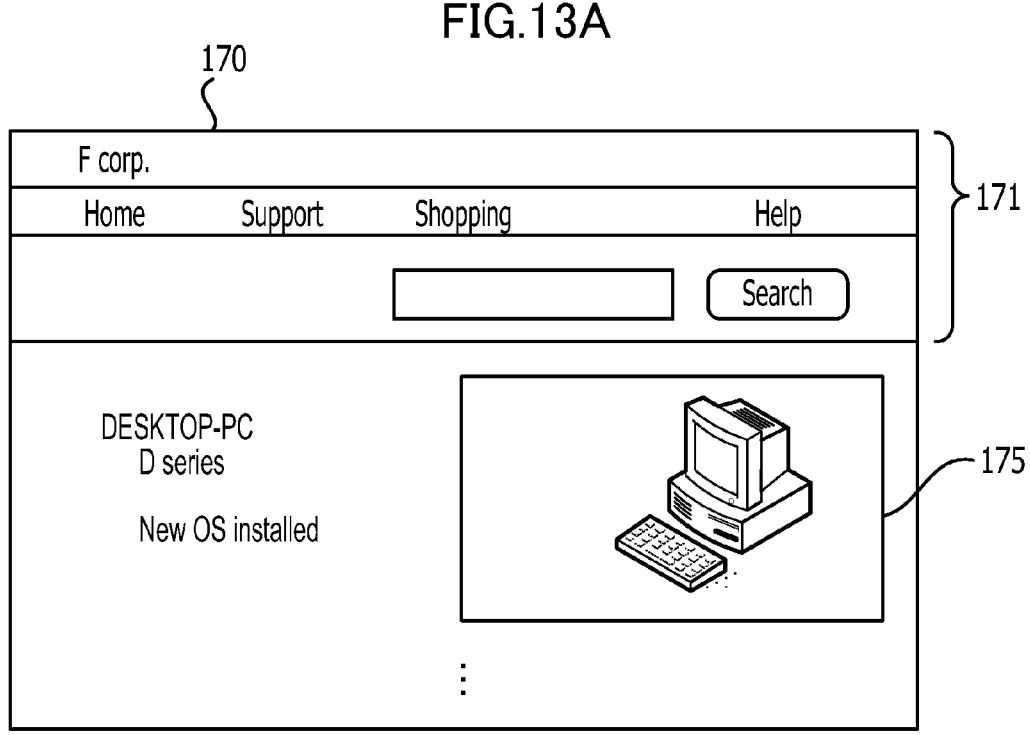
FIGS. 13A and 13B relate to test for absence of an image according to an embodiment.
Figure 13B:
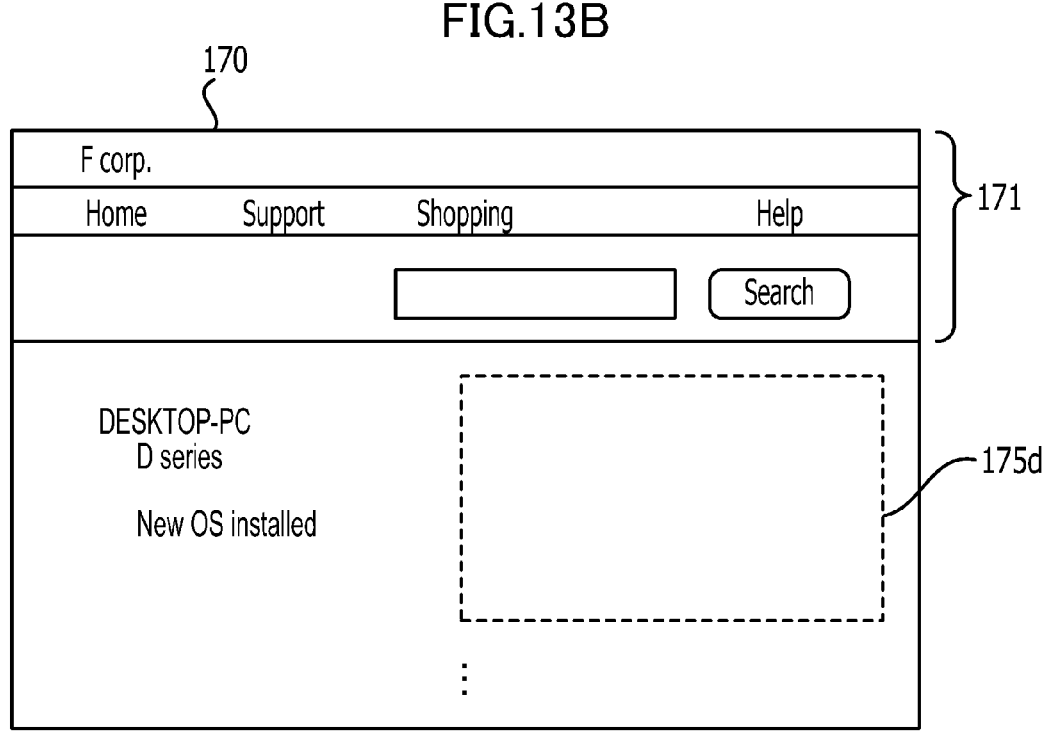

FIGS. 13A and 13B relate to test for absence of an image according to an embodiment. An HTML file display image 170 illustrated in FIGS. 13A and 13B is the one in which a web page being a test-target content is displayed on the basis of an HTML file and its displayed result is captured as an image. The HTML file display image 170 illustrated in FIG. 13A includes a header 171 and a display image 175. The HTML file display image 170 illustrated in FIG. 13B includes the header 171, but includes blank space 175d in place of the section of the display image 175, which is displayed in FIG. 13A.

For an embodiment, prior to an image absence test process described below with reference to FIGS. 14 to 16, image information indicating a correct image to be displayed in a web page is prepared. The prepared image information indicating the correct image is stored as determination information in the determination image information storage unit 151. After that, with the image absence test process, it is determined whether there is absence of an image, such as the blank space 175d illustrated in FIG. 13B, at which the display image 175 that should have been displayed is absent. When the determination by the image absence test process indicates that there is absence of an image, an error log is output.

Figure 14:
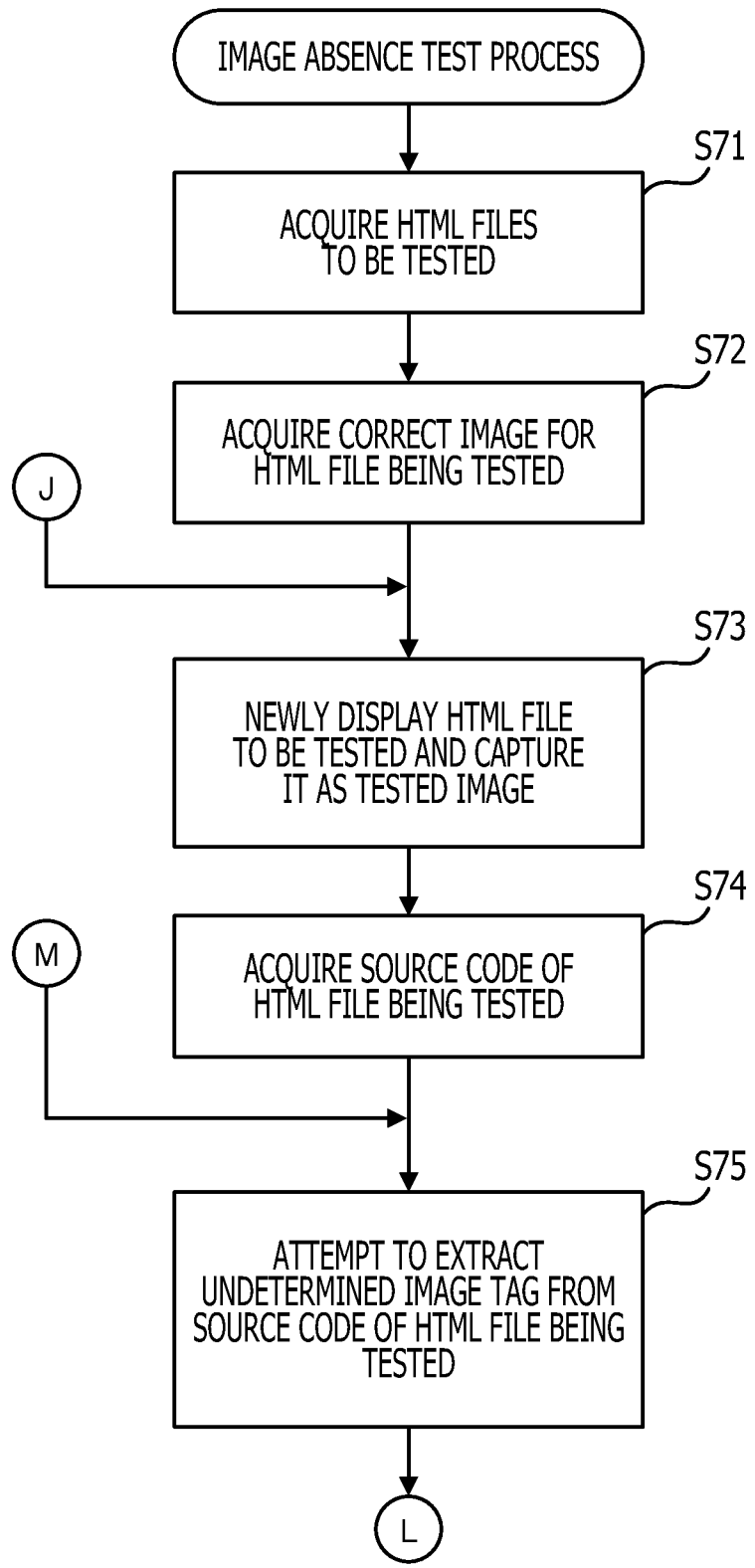
FIG. 14 is a flowchart that illustrates example operations for an image absence test process according to an embodiment.
Figure 15:
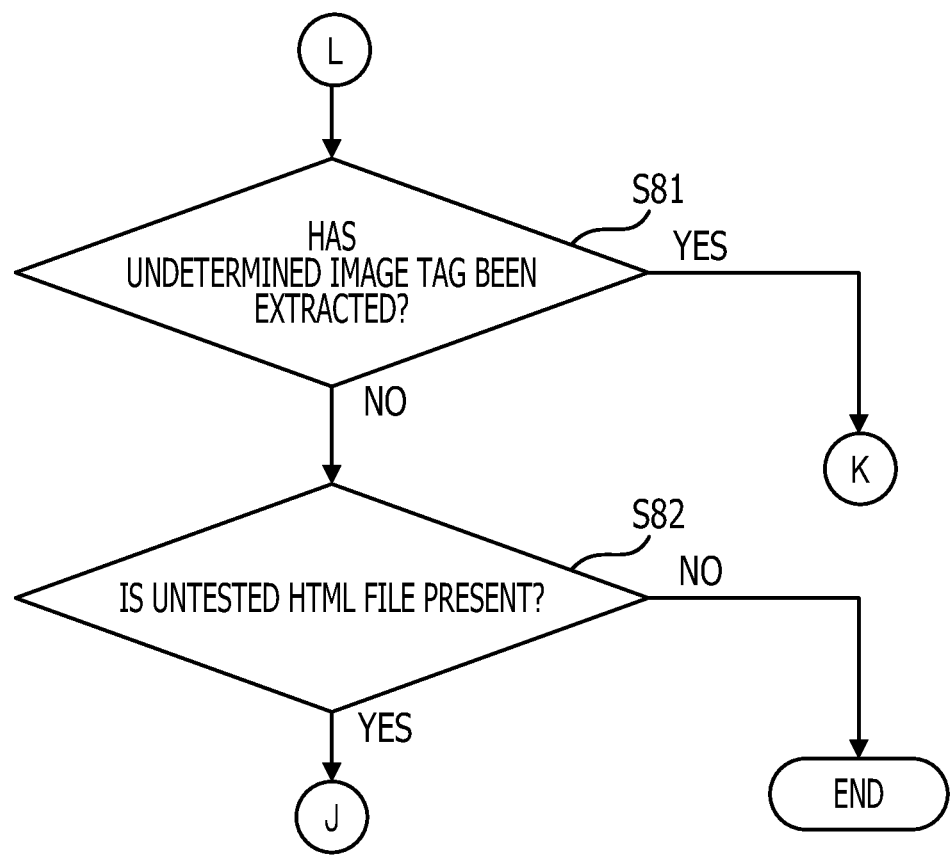
FIG. 15 is a flowchart that illustrates example operations for an image absence test process according to an embodiment.
Figure 16:
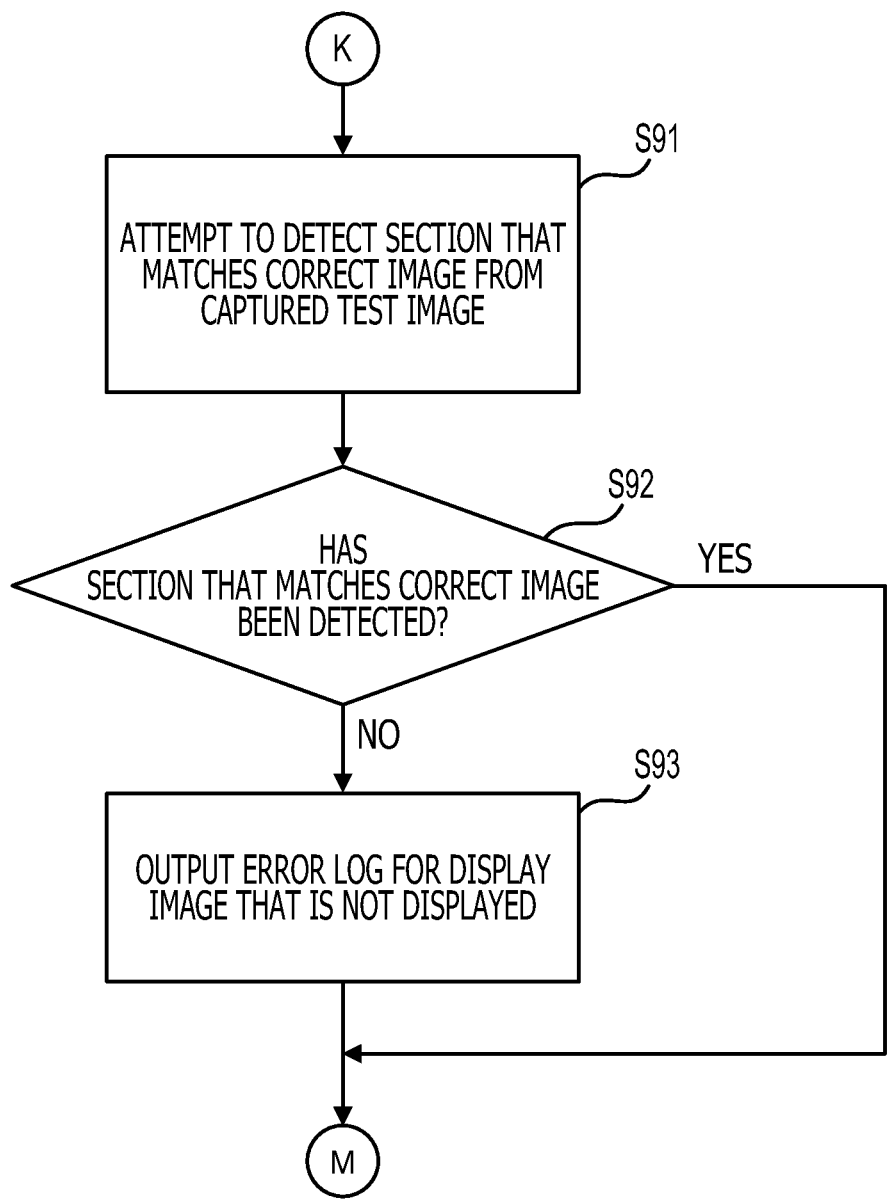
FIG. 16 is a flowchart that illustrates example operations for the image absence test process according to an embodiment.

FIGS. 14 to 16 are flowcharts that illustrate example operations for the image absence test process according to an embodiment. The image absence test process illustrated in FIGS. 14 to 16 is the process of testing a test-target web page for absence of a display image that should be displayed, the process being performed by the information processing apparatus 100. The image absence test process is started in response to an operation conducted by a tester of contents, for example.

The file acquisition unit 111 acquires data of Html files for web pages being test-target contents (S71). The content image analysis unit 113 acquires correct image information on a common section for the HTML files for the test-target web pages acquired by the file acquisition unit 111 from the determination image information storage unit 151 included in the determination information storage unit 150 (S72).

The content image creation unit 112 selects one from among untested test-target web pages and displays the HTML file for the selected web page. Then, the content image creation unit 112 captures the displayed result as a test image (S73).

The source code analysis unit 121 acquires source code of the HTML file selected by the content image creation unit 112 (S74). Then, the source code analysis unit 121 attempts to extract an image tag corresponding to an undetermined display image from the acquired source code (S75).

The determination unit 114 determines whether an image tag corresponding to an undetermined display image has been extracted by the source code analysis unit 121 (S81).

When determining that there is no undetermined image tag (NO in S81), the determination unit 114 determines whether there is an untested HTML file (S82). When the determination unit 114 determines that there is no untested HTML file (NO in S82), the process in an embodiment ends. When the determination unit 114 determines that there is an untested HTML file (YES in S82), that untested HTML file is displayed by the content image creation unit 112, as previously described, and the above-described process of capturing its displayed result as a test image is performed.

When the determination unit 114 determines that there is an undetermined image tag (YES in S81), the content image analysis unit 113 attempts to detect a section in the test image that matches the correct image (S91). The determination unit 114 determines whether the content image analysis unit 113 has detected a section that matches the correct image from the test image (S92). When the determination unit 114 determines that a section that matches the correct image has been detected from the test image (YES in S92), the source code analysis unit 121 attempts to extract an image tag corresponding to an undetermined display image, as previously described, and the above-described process is performed.

When the determination unit 114 determines that there is no section that matches the correct image in the test image (NO in S92), the output unit 115 outputs an error log indicating the existence of an image that is indicated by an image tag in the test-target HTML file and that is not displayed and also indicating the image tag corresponding to that location (S93). After that, the source code analysis unit 121 attempts to extract an image tag corresponding to an undetermined display image, as previously described, and the above-described process is performed.

Figure 17:
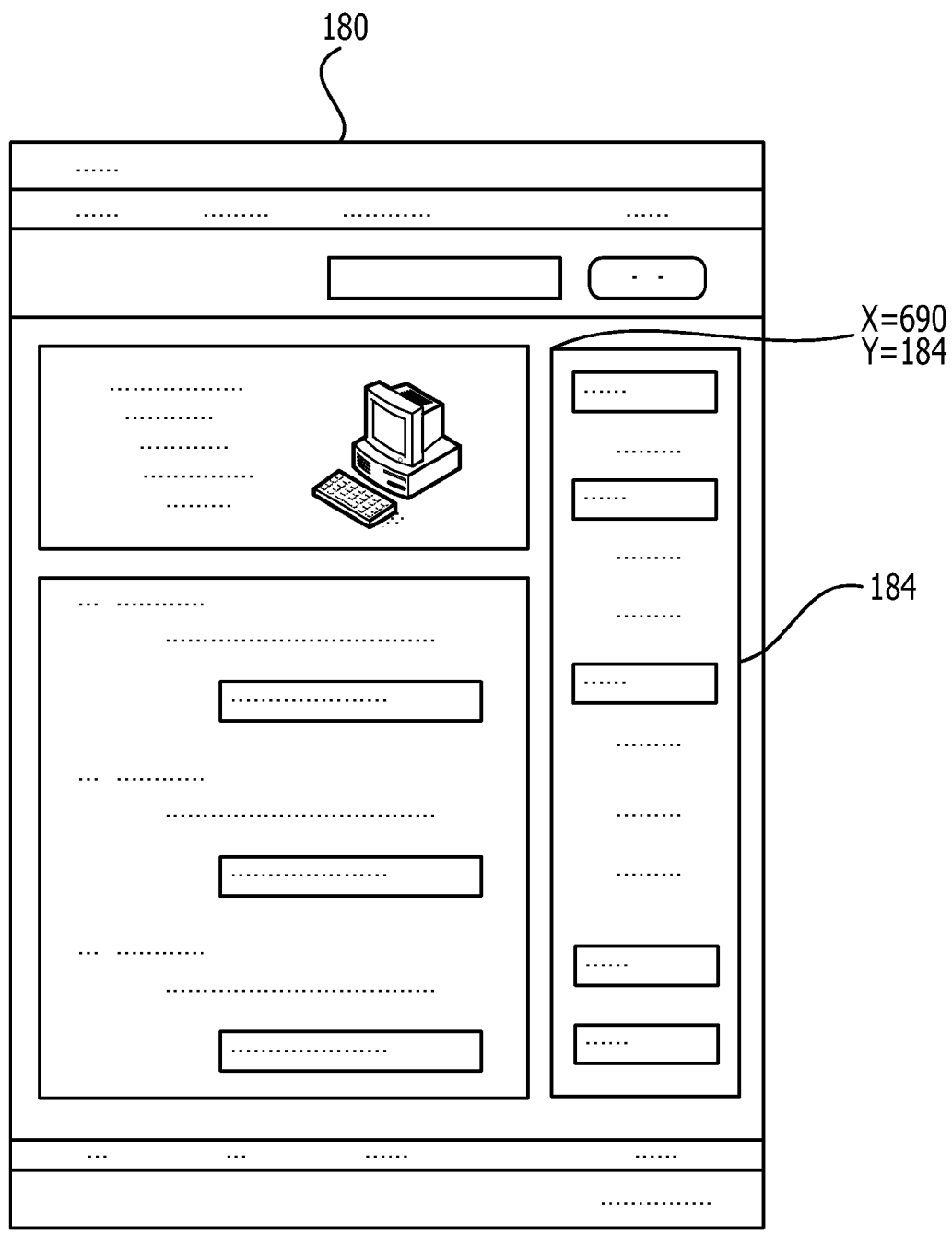
FIG. 17 relates to test for disorganized layout according to an embodiment.
Figure 18:
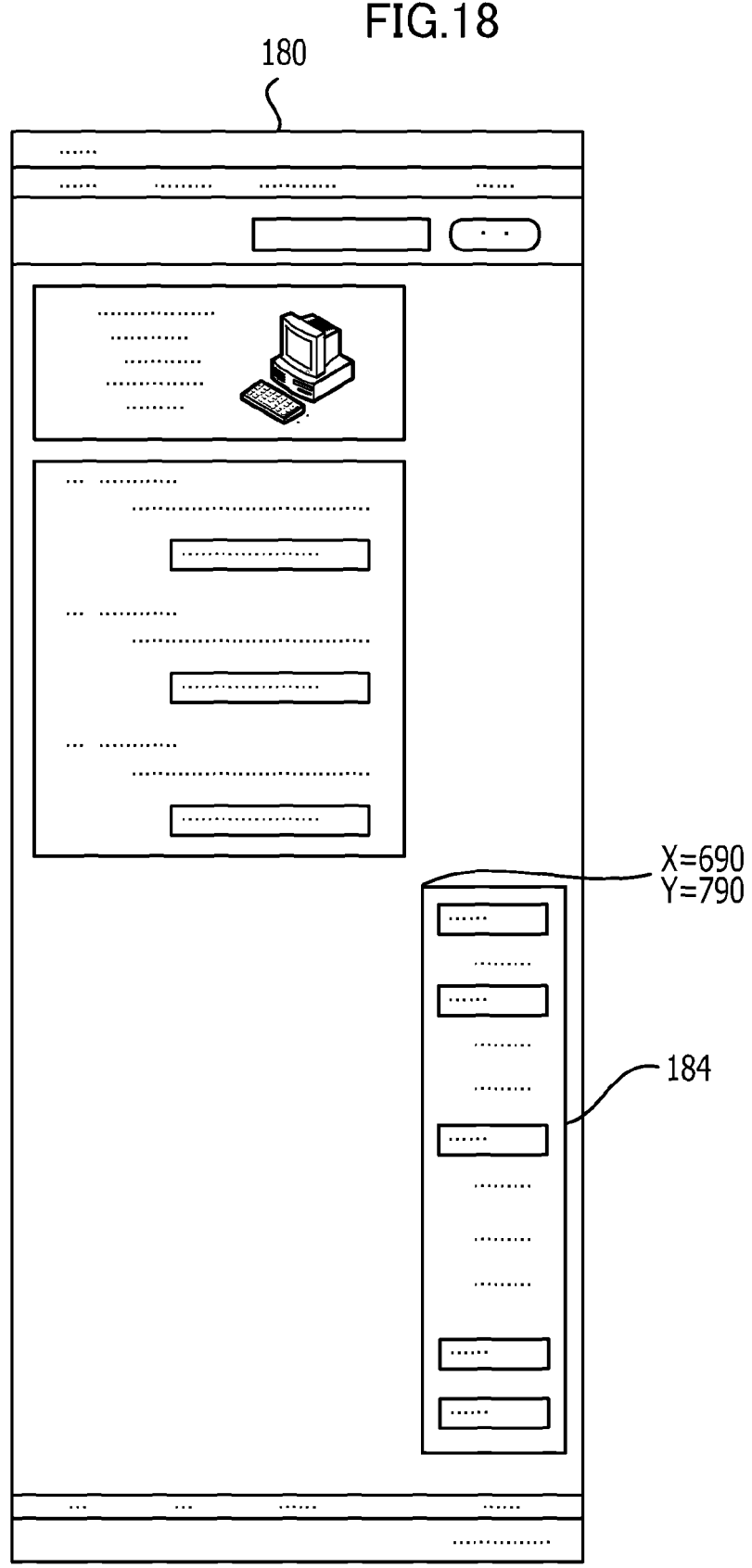
FIG. 18 relates to the test for disorganized layout according to an embodiment.

FIGS. 17 and 18 relate to test for disorganized layout according to an embodiment. An HTML file display image 180 illustrated in FIG. 17 is the one in which, in a web page based on the HTML file being a test-target content, when a reference image included in a plurality of web pages is correctly displayed, its displayed result is captured. The HTML file display image 180 includes a menu part 184.

The menu part 184 is a reference image commonly included in a plurality of pages. When the menu part 184 is correctly displayed, as illustrated in FIG. 17, it is displayed at a predetermined position on the HTML file display image 180. For the predetermined position, the x and y coordinates of the upper left corner of the menu part 184 are 690 for the x-coordinate and 184 for the y-coordinate, for example.

The HTML file display image 180 illustrated in FIG. 18 is the one in which, in a web page based on the HTML file being a test-target content, when the position of the displayed menu part 184 is displaced, its displayed result is captured. In FIG. 18, the menu part 184 is displayed at a position displaced from the above predetermined position on the HTML file display image 180. For example, the x and y coordinates of the upper left corner of the menu part 184 are 690 for the x-coordinate and 790 for the y-coordinate. The menu part 184 illustrated in FIG. 18 is a position comparative image for use in detecting disorganized layout by comparison with the position of the reference image illustrated in FIG. 17.

For an embodiment, with a layout test process described below, it is determined whether a reference image included in a web page, such as the menu part 184, is displayed at the same correct position as the position in a representative page at which the reference image is correctly displayed, as illustrated in FIG. 17, or at a position displaced from the correct position, as illustrated in FIG. 18, for each page. In this way, whether layout is disorganized is tested.

For an embodiment, prior to the layout test process, aside from a test-target HTML file, the display coordinates indicting the correct position at which the menu part 184 being a reference image illustrated in FIG. 17 should be displayed and displacement allowance information are prepared. The displacement allowance information sets an allowable range for displacement between the position at which a reference image should be displayed and the position at which the reference image is actually displayed. These prepared reference image position information and displacement allowance information are stored as determination information in the determination image information storage unit 151. After that, with the layout test process, a test-target HTML display image and an image of a representative page are compared to determine whether the position of the reference image in the test target is correct. When the determination by the layout test process indicates that layout is disorganized, an error log is output.

Figure 19:
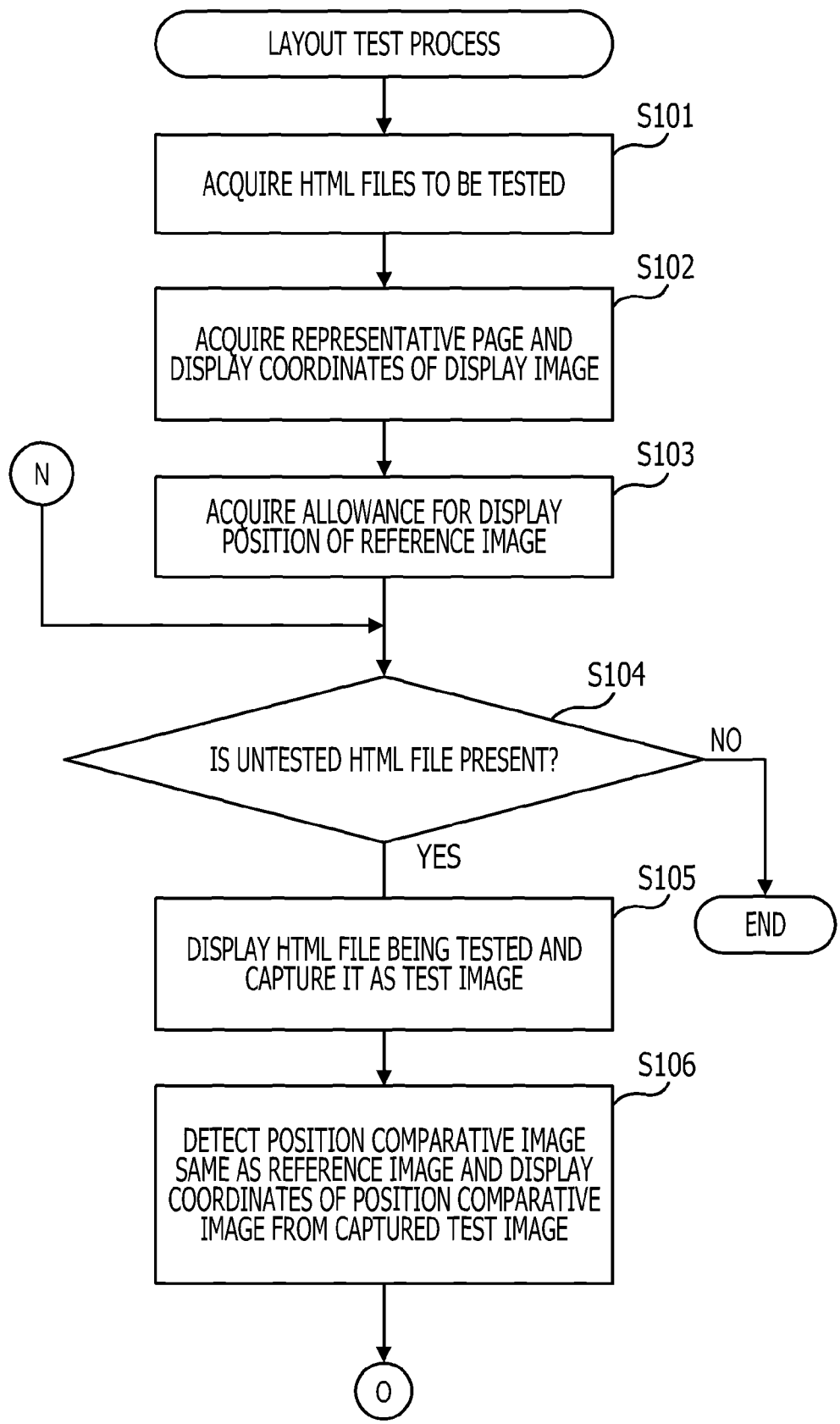
FIG. 19 is a flowchart that illustrates example operations for a layout test process according to an embodiment.
Figure 20:
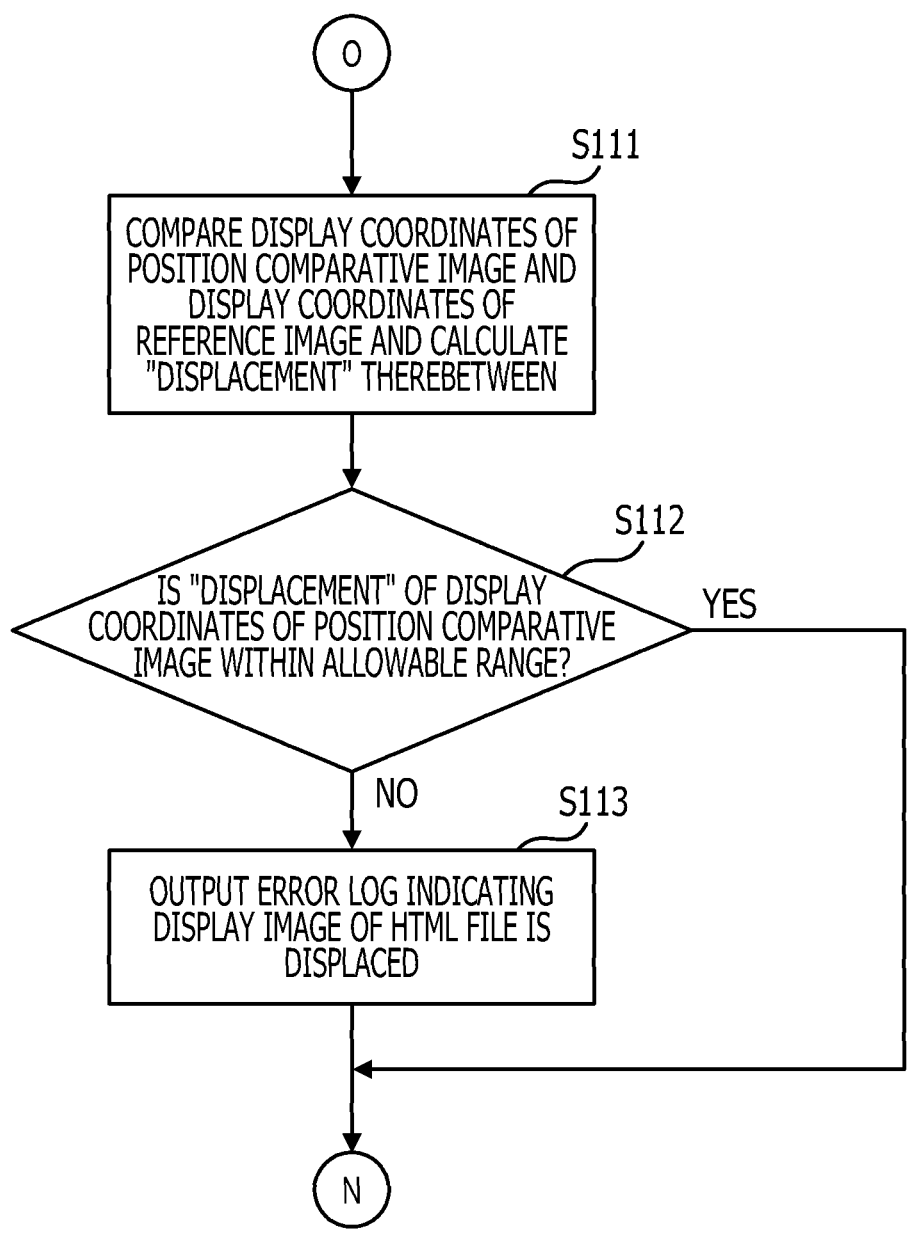
FIG. 20 is a flowchart that illustrates example operations for the layout test process according to an embodiment.

FIGS. 19 and 20 are flowcharts that illustrate example operations for the layout test process according to an embodiment. The layout test process illustrated in FIGS. 19 and 20 is the process of testing the display position of a reference image included in a plurality of test-target web pages, the process being performed by the information processing apparatus 100. The layout test process is started in response to an operation conducted by a tester of contents, for example.

The file acquisition unit 111 acquires data of HTML files for web pages being test-target contents (S101). The content image analysis unit 113 acquires reference image information indicating a reference image for the HTML files for the test-target web pages acquired by the file acquisition unit 111 and display coordinate information indicating the correct display position of the reference image from the determination image information storage unit 151 included in the determination information storage unit 150 (S102).

The content image analysis unit 113 acquires displacement allowance information from the allowance information storage unit 152 included in the determination information storage unit 150 (S103). The displacement allowance information indicates allowance in determination of displacement of a reference image.

The determination unit 114 determines whether there is an untested HTML file (S104).

The content image creation unit 112 selects one from among untested test-target web pages and displays the HTML file for the selected web page. Then, the content image creation unit 112 captures its displayed result as a test image (S105). When the determination unit 114 determines that there is no untested HTML file (NO in S104), the process in an embodiment ends.

The content image analysis unit 113 detects a position comparative image that is the same as the reference image from the test image captured by the content image creation unit 112 and also detects the display coordinates of the detected position comparative image (S106).

The determination unit 114 compares the display coordinates of the position comparative image detected by the content image analysis unit 113 and the display coordinates of the reference image acquired by the content image analysis unit 113 and calculates displacement of the display coordinates of the position comparative image (S111).

The determination unit 114 determines whether the calculated displacement is within an allowable range (S112). When determining that the displacement is within the allowable range (YES in S112), the determination unit 114 determines whether there is an untested HTML file, as previously described.

When the determination unit 114 determines that the displacement is outside the allowable range (NO in S112), the output unit 115 outputs an error log indicating that the display coordinates of the position comparative image in the test-target HTML file are displaced (S113). After that, the determination unit 114 determines whether there is an untested HTML file, as previously described.

Figure 21:
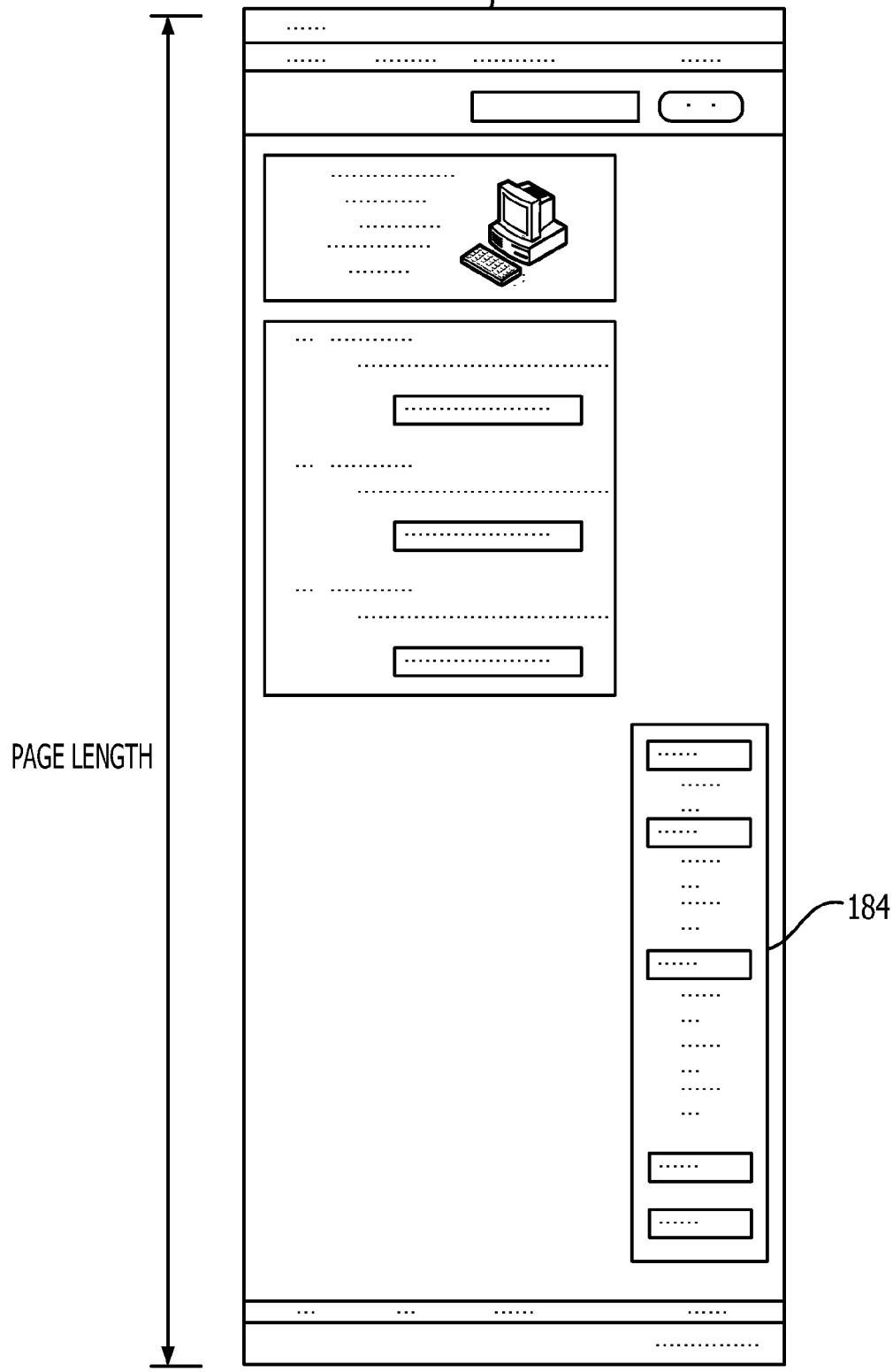
FIG. 21 relates to test of a length of a page according to an embodiment.

FIG. 21 relates to test of a page length according to an embodiment. The HTML file display image 180 illustrated in FIG. 21 is the one in which a displayed result of a web page being a test-target content based on an HTML file is captured. In this HTML file display image 180 illustrated in FIG. 21, as in the case of FIG. 18, layout is disorganized because of displacement of the display position of the menu part 184 and the page length is longer than normal.

When the HTML file display image 180 is correctly displayed, it is displayed as illustrated in FIG. 17, which is previously described. In contrast, like the HTML file display image 180 illustrated in FIG. 21, the page length may be longer than originally expected because of, for example, incorrect arrangement of elements of a web page in some cases. Such cases are detected by a page length test process described below.

For an embodiment, prior to the page length test process, page length allowance information that sets an allowable range for a page length that is actually displayed in a web page is prepared. That prepared page length allowance information is stored as determination information in the determination image information storage unit 151. When the determination by the page length test process indicates that the page length is longer than expected, an error log is output.

Figure 22:
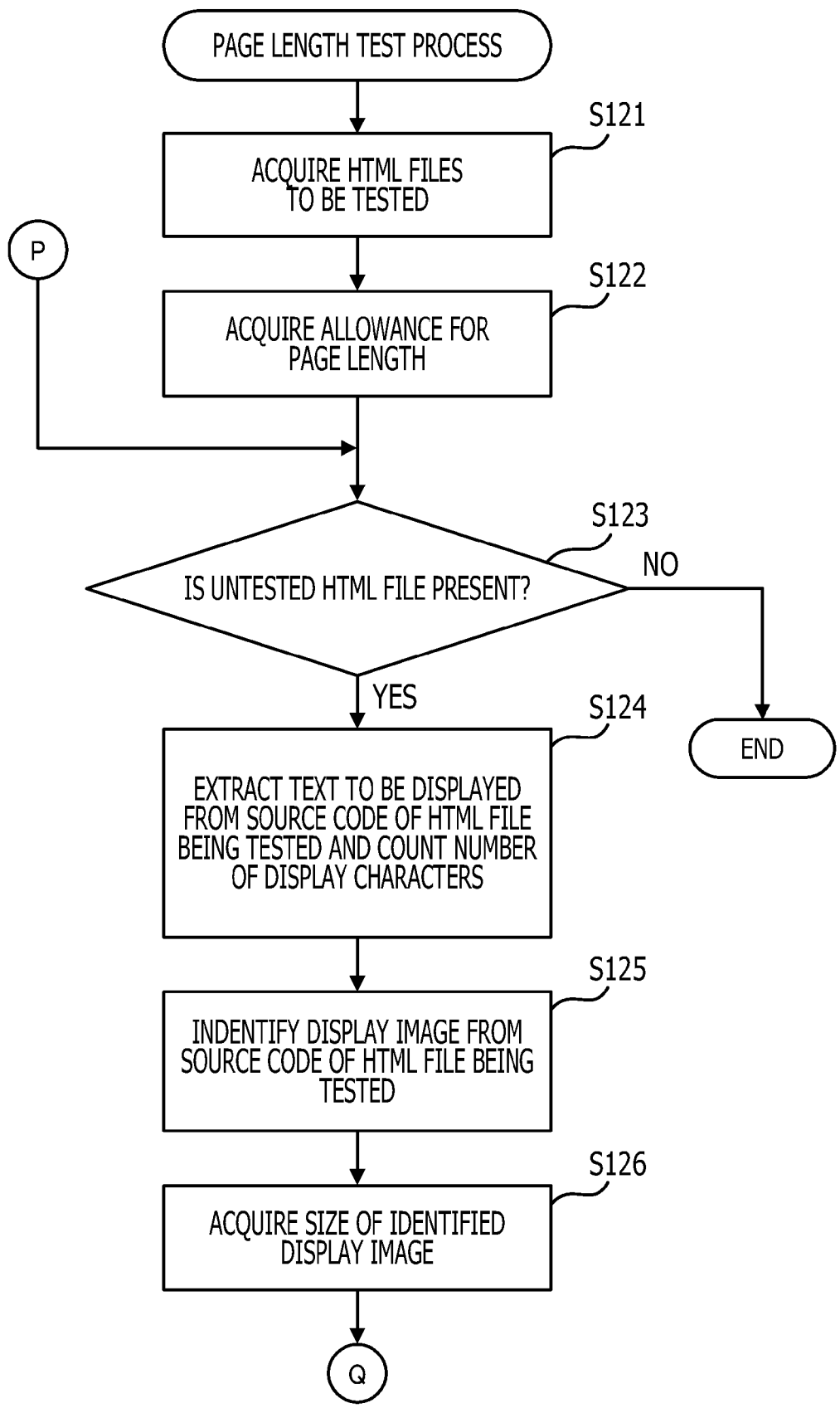
FIG. 22 is a flowchart that illustrates example operations for a page length test process according to an embodiment.
Figure 23:
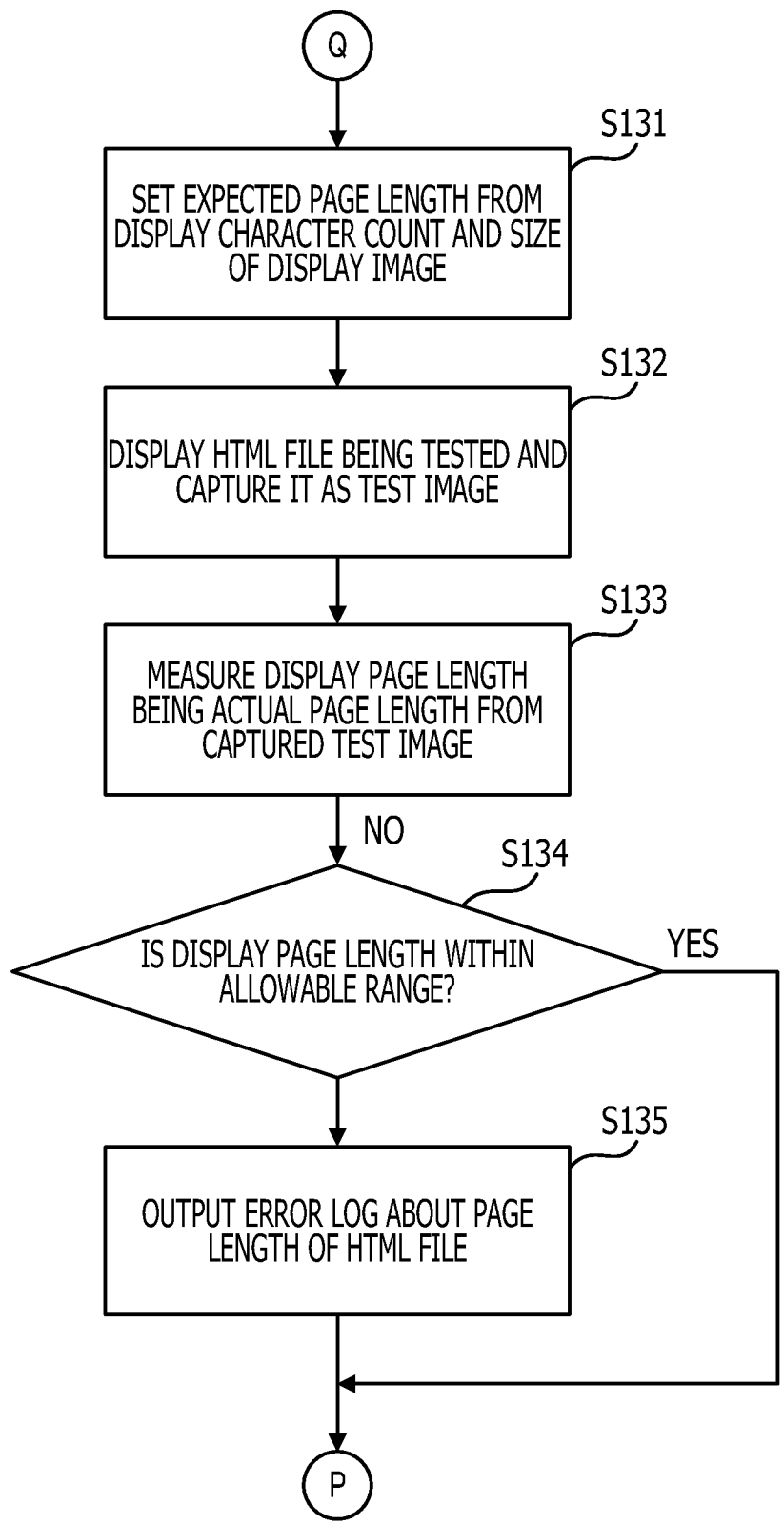
FIG. 23 is a flowchart that illustrates example operations for a page length test process according to an embodiment.

FIGS. 22 and 23 are flowcharts that illustrate example operations for the page length test process according to an embodiment. The page length test process illustrated in FIGS. 22 and 23 is the process of testing the page length being the vertical length of a test-target web page, the process being performed by the information processing apparatus 100. The page length test process is started in response to an operation conducted by a tester of contents, for example.

The file acquisition unit 111 acquires data of HTML files for web pages being test-target contents (S121). The determination unit 114 acquires page length allowance information from the allowance information storage unit 152 included in the determination information storage unit 150 (S122). The page length allowance information indicates allowance in determination of the page length described below.

The determination unit 114 determines whether there is an untested HTML file (S123).

When the determination unit 114 determines that there is an untested HTML file (YES in S123), the source code analysis unit 121 selects one HTML file from among untested test-target web pages acquired by the file acquisition unit 111 and acquires source code thereof. Then, the source code analysis unit 121 extracts text to be displayed in the web page from the source code of the selected web page and counts the number of characters to be displayed in the web page (S124).

When the determination unit 114 determines that there is no untested HTML file (NO in S123), the process in an embodiment ends.

The source code analysis unit 121 identifies a display image to be displayed in the web page from an image tag included in the acquired source code (S125). Here, if the web page includes a plurality of display images, the source code analysis unit 121 indentifies all of the display images.

The content image analysis unit 113 displays the display image based on the image tag corresponding to the identified display image, measures the size of that display image being displayed, and acquires the size of the display image (S126). Here, if a plurality of display images is identified, the content image analysis unit 113 measures the sizes of all of the display images.

The content image analysis unit 113 sets an expected page length being an expected length of a test-target web page on the basis of the display character count obtained by the source code analysis unit 121 and the size of the image to be displayed acquired by the content image analysis unit 113 (S131). Generally, web pages with similar structures have a correlation between the display character count and the page length. Based on this, for an embodiment, if the display character count is high, the expected page length is set long, whereas if the display character count is low, it is set short.

The expected page length may be calculated by multiplying an acquired display character count by a predetermined coefficient, for example. The expected page length may be set depending on a relevant group of a plurality of number range groups into which a display character count is divided. For example, for 0 to 400 characters, the expected page length may be set at 1,200 dots; for 401 to 800 characters, the expected page length may be set at 2,400 dots.

The content image creation unit 112 displays the HTML file for the test-target web page. Then, the content image creation unit 112 captures its displayed result as a test image (S132).

The content image analysis unit 113 measures the display page length being the length of a web page that is actually displayed, on the basis of the captured test image (S133). The determination unit 114 calculates the difference between the display page length measured by the content image analysis unit 113 and the expected page length. Then, the determination unit 114 compares the calculated difference and the allowance and thus determines whether the display page length is within the allowable range (S134).

When the determination unit 114 determines that the page length is outside the allowable range (NO in S134), the output unit 115 outputs an error log indicating that the page length of the test-target HTML file is outside the allowable range (S135). When the determination unit 114 determines that the page length is within the allowable range (YES in S134), the determination unit 114 determines whether there is an untested HTML file, as previously described, and the above-described process is performed.

Figure 24:
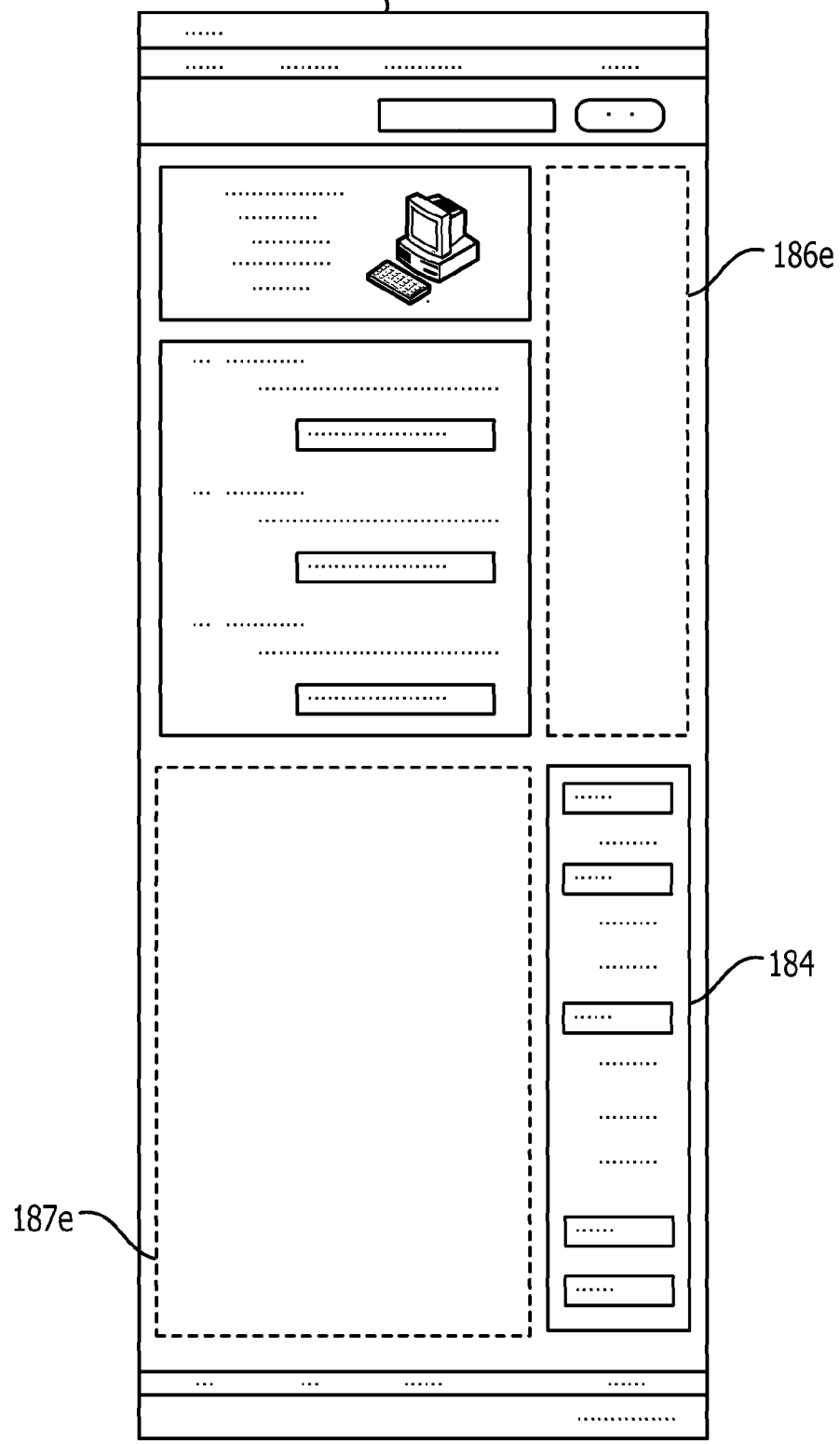
FIG. 24 relates to test of a size of blank space according to an embodiment.

FIG. 24 relates to test of a blank space size according to an embodiment. The HTML file display image 180 illustrated in FIG. 24 is the one in which a displayed result of a web page based on an HTML file being a test-target content is captured. In the HTML file display image 180 illustrated in FIG. 24, layout is disorganized because of displacement of the position at which the menu part 184 is displayed, as in the case of FIGS. 18 and 21, and a large size of blank space is displayed in the page.

When the HTML file display image 180 is correctly displayed, it is displayed as illustrated in FIG. 17, which is previously described. In contrast, like the HTML file display image 180 illustrated in FIG. 24, because of incorrect arrangement of elements of the web page, a large size of blank space, as illustrated as blank space sections 186e and 187e, may be present in some cases.

Such cases are detected by a blank space size test process described below according to an embodiment. When determination in the blank space size test process indicates that blank space is large, an error log is output.

Figure 25:
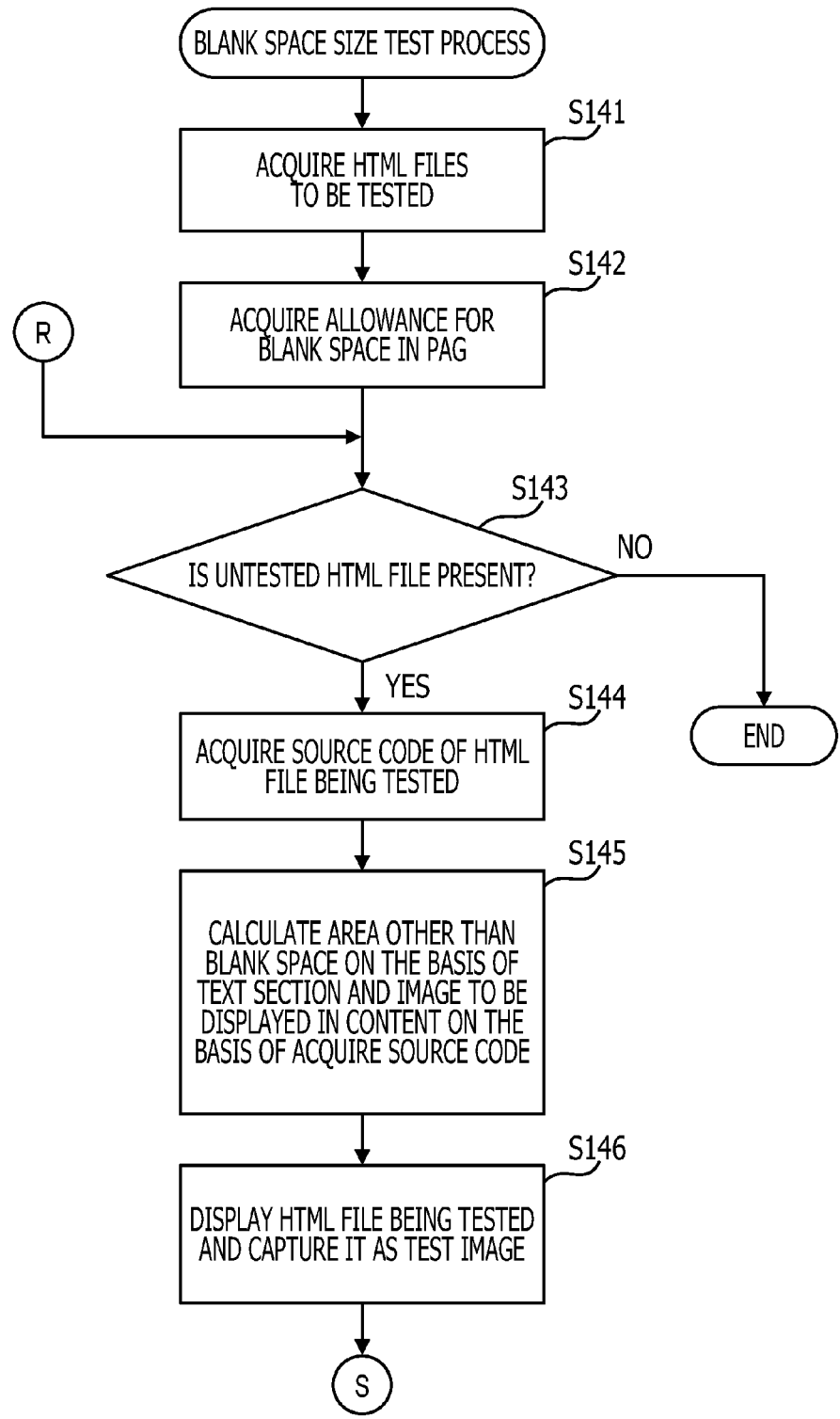
FIG. 25 is a flowchart that illustrates example operations for a blank space size test process according to an embodiment.
Figure 26:
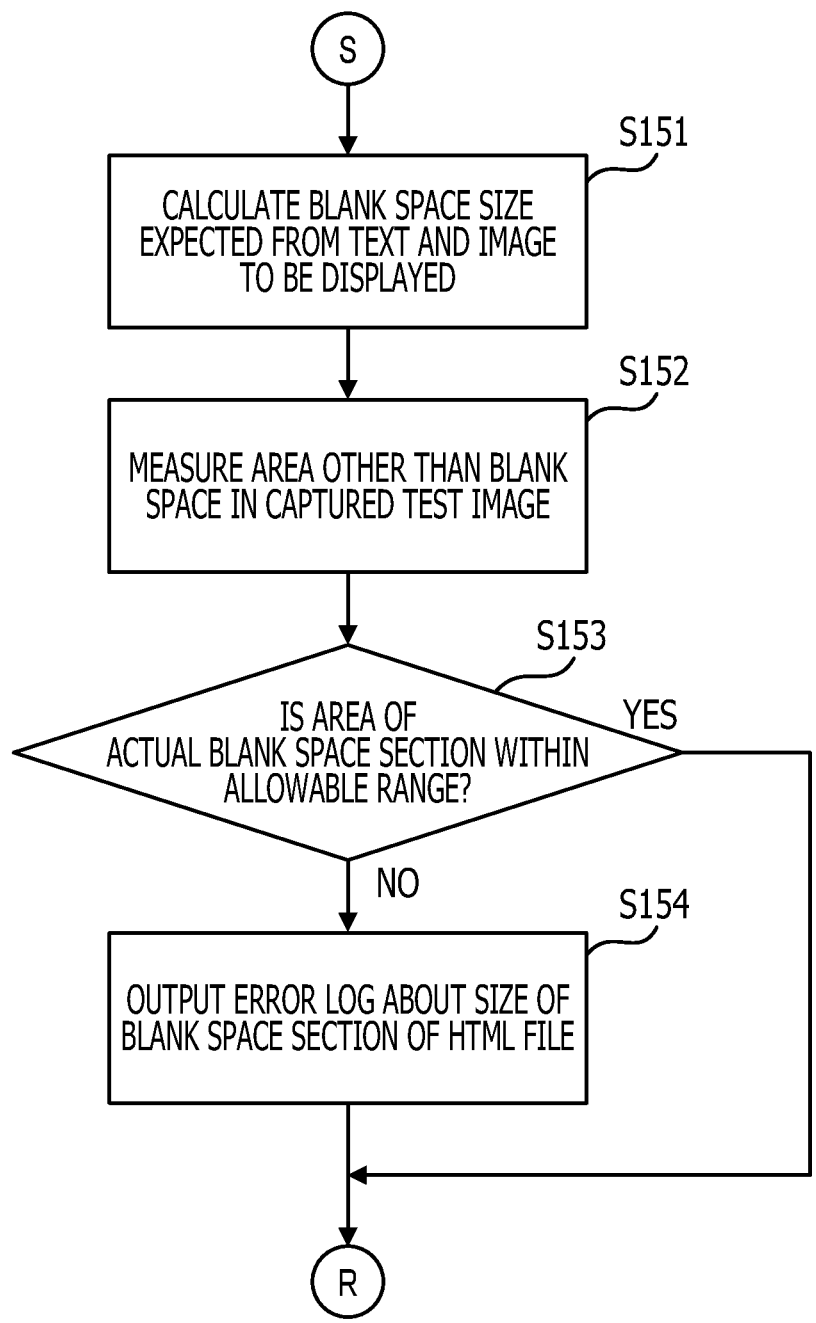
FIG. 26 is a flowchart that illustrates example operations for the blank space size test process according to an embodiment.

FIGS. 25 and 26 are flowcharts that illustrate example operations for the blank space size test process according to an embodiment. The blank space size test process illustrate FIGS. 25 and 26 is the process of testing the blank space size in a test-target web page, the process being performed by the information processing apparatus 100. The blank space size test process is started in response to an operation conducted by a tester of contents, for example.

The file acquisition unit 111 acquires data of HTML files for web pages being test-target contents (S141). The content image analysis unit 113 acquires blank space size allowance information from the allowance information storage unit 152 included in the determination information storage unit 150 (S142). The blank space size allowance information indicates allowance in determination of a blank space size described below.

The determination unit 114 determines whether there is an untested HTML file (S143). When the determination unit 114 determines that there is no untested HTML file (NO in S143), the process in an embodiment ends.

When the determination unit 114 determines that there is an untested HTML file (YES in S143), the source code analysis unit 121 selects one untested HTML file from among the test-target web pages acquired by the file acquisition unit 111 and acquires source code thereof (S144). Then, the source code analysis unit 121 extracts text to be displayed in the web page from the source code of the selected web page and also acquires a display image to be displayed. After that, the source code analysis unit 121 counts the number of characters to be displayed in the web page on the basis of the extracted text.

The content image analysis unit 113 causes the acquired display image to be actually displayed on the monitor 11 and acquires the size of the displayed display image. The content image analysis unit 113 calculates the area of the portion other than blank space in the web page, that is, the area where the display image and the display text are to be displayed on the basis of the acquired size of the display image and the display character count obtained by the source code analysis unit 121 (S145).

The content image creation unit 112 displays the HTML file for the test-target web page and captures its displayed result as a test image (S146).

The content image creation unit 112 calculates the expected blank space size on the basis of the display character count and the area where the display image is to be displayed calculated by the content image analysis unit 113 (S151). The content image analysis unit 113 measures the area of the blank space section in the web page that is actually displayed on the basis of the captured test image (S152).

Here, for an embodiment, in measuring the blank space size in a test image in the blank space size test process, rectangles having a given size are placed in a blank space section, and the number of the rectangles being placed is counted to measure the area of the blank space. Examples of each of the rectangles having a given size include that corresponding to a single standard double-width character in a web page and that corresponding to one dot in a display screen. The vertical and horizontal dimensions of the rectangle may be specified when necessary. A method of measuring the blank space size in a test image is not limited to the above example method.

The determination unit 114 determines whether the blank space size measured by the content image analysis unit 113 is within the range of the allowance (S153). When the determination unit 114 determines that the blank space size is within the range of the allowance (YES in S153), the determination unit 114 determines whether there is an untested HTML file, as previously described, and the above-described process is performed.

When the determination unit 114 determines that the blank space size is outside the range of the allowance (NO in S153), the output unit 115 outputs an error log indicating that the blank space size in the test-target HTML file is too large (S154). After that, like when determining that the blank space size is within the range of the allowance, the determination unit 114 determines whether there is an untested HTML file, as previously described, and the above-described process is performed.

Error logs recorded in the information processing apparatus 100 according to an embodiment are described next. FIGS. 27A and 27B illustrate error logs in the common section test process according to an embodiment. An error log 191a illustrated in FIG. 27A is an example of data indicating a log output when, in the above-described common section test process, no header is displayed in an HTML file display image. The error log 191a includes a message indicating that no header is displayed, the uniform resource locator (URL) of the page in which no header is displayed, and the file name, for example.

An error log 191b illustrated in FIG. 27B is an example of a log output when, in the above-described common section test process, the display coordinates of the header are displaced in an HTML file display image. For example, the error log 191b includes a message indicating that the display coordinates of the header are displaced and indicating the amount of the displacement, the URL of the page in which the display coordinates of the header are displaced, and the file name.

FIGS. 27A and 27B illustrate error logs when errors relating to a header are detected. A similar error log is also output when an error relating to a footer is detected. The error logs 191a and 191b are generated and output by the output unit 115 and stored in the log information storage unit 140.

FIGS. 28A and 28B illustrate error logs in the alternative text test process according to an embodiment. An error log 192a illustrated in FIG. 28A is an example of data indicating a log output when, in the above-described alternative text test process, an alt display element in an HTML file display image does not match source code of the HTML file. The error log 192a includes a message indicating that an alt display element does not match source code of the HTML file, the URL of the page having a mismatch of the alt display element, the file name, the relevant line in which the different alt display element is indicated in the source code, display text that is actually displayed on the basis of the HTML file, and correct text that is expected to be displayed in that web page, for example.

An error log 192b illustrated in FIG. 28B is another example of data indicating a log output when, in the above-described alternative text test process, an alt display element in an HTML file display image does not match source code of the HTML file. The error log 192b includes a message indicating that an alt display element does not match source code of the HTML file, the URL of the page having a mismatch of the alt display element, the file name, the relevant line in which the different alt display element is indicated in the source code, and an image tag, for example.

The error logs 192a and 192b are generated and output by the output unit 115 and stored in the log information storage unit 140.

FIG. 29 illustrates an error log in the image absence test process according to an embodiment. An error log 193a illustrated in FIG. 29 is an example of data indicating a log output when there is a display image that is not displayed in an HTML file display image and that should be displayed in the above-described image absence test process. The error log 193a includes a message indicating that there is a display image that is not displayed, the URL of the page in which the display image that is not displayed exists, the file name, the relevant line in which the display image that is not displayed is indicated in the source code, and an image tag, for example.

The error log 193a is generated and output by the output unit 115 and stored in the log information storage unit 140.

FIG. 30A illustrate error logs in the layout test process according to an embodiment. An error log 194a illustrated in FIG. 30A is an example of data indicating a log output when, in the above-described layout test process, the display coordinates of a displayed reference image being an image of a common section existing in a plurality of web pages in an HTML file display image are different from the display coordinates in a representative page. The error log 194a includes a message indicating that the display coordinates of a reference image differ from those in a representative page, the URL of the page in which the display coordinates of the reference image are different, and the file name, for example.

An error log 194b illustrated in FIG. 30B is an example of data indicating a log output when, in the above-described layout test process, no reference image is displayed in an HTML file display image. The error log 194b includes a message indicating that no reference image is displayed, the URL of the page in which no reference image is displayed, and the file name, for example.

The error logs 194a and 194b are generated and output by the output unit 115 and stored in the log information storage unit 140.

FIGS. 31A and 31B illustrate error logs in the page length test process according to an embodiment. An error log 195a illustrated in FIG. 31A is an example of data indicating a log output when, in the above-described page length test process, the page length being the length of a web page displayed in an HTML file display image is too long. The error log 195a includes a message indicating that the page length is too long, the URL of the page in which the page length is too long, and the file name, for example.

An error log 195b illustrated in FIG. 31B is an example of data indicating a log output when the page length of a web page in an HTML file display image is too short. The error log 195b includes a message indicating that the page length is too short, the URL of the page in which the page length is too short, and the file name, for example.

The error logs 195a and 195b are generated and output by the output unit 115 and stored in the log information storage unit 140.

FIG. 32 illustrates an error log in the blank space size test process according to an embodiment. An error log 196a illustrated in FIG. 32 is an example of data indicating a log output when, in the above-described blank space size test process, the blank space size in a web page in an HTML file display image is too large. The error log 196a includes a message indicating that the blank space size is too large, the URL of the page in which the blank space size is too large, and the file name, for example.

The error log 196a is generated and output by the output unit 115 and stored in the log information storage unit 140. As described above, with an embodiment, in displaying a web page, whether a common section, such as a header or footer, is correctly displayed and whether an alt display element is correct are automatically tested.

With an embodiment, in displaying a web page, whether layout of the web page is disorganized is automatically tested on the basis of the display position of a reference image included in the web page, the page length, and the blank space size.

An embodiment is described next. The description focuses on differences from the above described embodiment, the same reference numerals are used in substantially the same items as in the above-described embodiment, and the detailed description thereof is omitted.

Another embodiment differs from an embodiment in that a display image is acquired from an image tag in source code of an HTML file and in that character information extracted from the display image or meta information on the display image are used.

Figure 33:
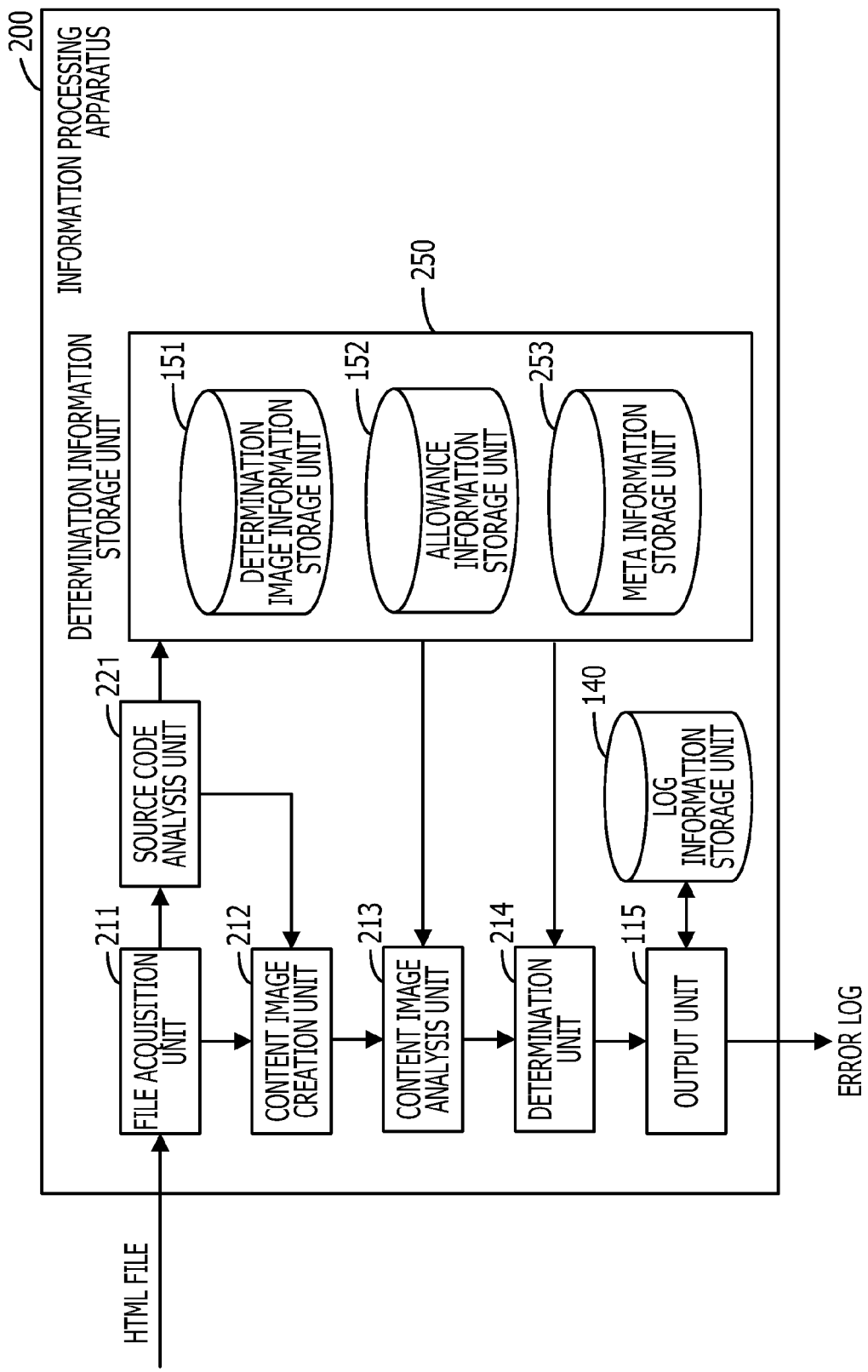
FIG. 33 is a block diagram that illustrates a configuration of an information processing apparatus according to an embodiment.

FIG. 33 is a block diagram that illustrates a configuration of an information processing apparatus according to an embodiment. An information processing apparatus 200 illustrated in FIG. 33 has the display testing function of testing displaying of a content. The information processing apparatus 200 includes a file acquisition unit 211, a content image creation unit 212, a content image analysis unit 213, a determination unit 214, an output unit 115, a source code analysis unit 221, a log information storage unit 140, and a determination information storage unit 250. The determination information storage unit 250 includes a determination image information storage unit 151, an allowance information storage unit 152, and a meta information storage unit 253.

The information processing apparatus 200 according to an embodiment executes an alternative text test process described below on a test-target web page to carry out test. The information processing apparatus 200 performs the above-described common section test process, image absence test process, layout test process, page length test process, and blank space size test process to carry out test, similar to the information processing apparatus 100 according to an embodiment. At this time, similar to the case in which the information processing apparatus 100 is used, a tester of web pages may make the information processing apparatus 200 carry out test using any process of the above-described processes on a web page and also may enable all tests to be automatically carried out on web pages.

The file acquisition unit 211 acquires an HTML file for use in displaying a web page being a test-target content, similar to the file acquisition unit 111 in an embodiment. The HTML file included source code including an image tag. The image tag in the source code identifies a display image and indicates an alt display element of the display image.

The content image creation unit 212 displays a display image identified by image identifying information, such as an image tag, and generates display image information. The content image creation unit 212 creates a test image so that a content is actually displayed on the monitor 11 on the basis of an HTML file, similar to the content image creation unit 112 in an embodiment.

The content image analysis unit 213 extracts character information from display image information and generates recognized text information. The content image analysis unit 213 acquires display image position information indicating the position of a display image that has the same substance as a correct image and that is displayed in a test image on the basis of correct image information included in determination information, similar to the content image analysis unit 113 in an embodiment. The content image analysis unit 213 extracts character information from alternative text image information and generates recognized text information. The content image analysis unit 213 attempts to extract a display image that has the same substance as a correct image and that is displayed in a test image on the basis of correct image information included in determination information.

The content image analysis unit 213 measures the page length of a test image and generates display page length information. The content image analysis unit 213 displays a display image on the basis of image identifying information included in determination information stored in the determination information storage unit 250 and generates image size information on the measured size of that display image. Then, the content image analysis unit 213 generates expected page length information indicating an expected page length of the content on the basis of the generated image size information and display character count information included in determination information.

The content image analysis unit 213 acquires display image position information indicating the position of a display image that has the same substance as a reference image and that is displayed in a test image on the basis of reference image information included in determination information.

The content image analysis unit 213 calculates the blank space size in a test image and generates display blank space size information. The content image analysis unit 213 displays a display image on the basis of image identifying information included in determination information stored in the determination information storage unit 250 and generates image size information indicating a measured image size of the display image. Then, the content image analysis unit 213 generates expected blank space size information indicating an expected blank space size expected for the content on the basis of the generated image size information and the display character count information included in the determination information.

The determination unit 214 compares correct text information stored in the determination image information storage unit 151 and recognized text information generated by the content image analysis unit 213 and determines that there is a mismatch between alt display elements when the correct text information and the recognized text information do not match.

When the content image analysis unit 213 doesn't extract character information from display image information, the determination unit 214 acquires meta-text information included in meta information relating to a display image stored in the meta information storage unit 253.

The determination unit 214 compares correct image information stored in the determination image information storage unit 151 and meta-text information acquired by the content image analysis unit 213 and determines that there is a mismatch between alt display elements when the correct text information and the meta-text information do not match.

The determination unit 214 compares correct image position information included in determination information stored in the determination information storage unit 250 and display image position information acquired by the content image analysis unit 213 and determines whether the position of the display image is normal, similar to the determination unit 114 in an embodiment. For example, when the position information does not match in the comparison, the determination unit 214 determines that the position of the display image is abnormal.

When no display image is extracted from a test image by the content image analysis unit 213, the determination unit 214 determines that the display image is absent. The determination unit 214 compares display page length information and expected page length information generated by the content image analysis unit 213 and determines whether the page length is normal. For example, the determination unit 214 acquires the difference between the page length in the display page length information and that in the expected page length information and determines that the display page length of the content when the acquired difference is outside an allowable range set on the basis of page length allowance information included in determination information.

The determination unit 214 compares reference image position information included in determination information stored in the determination information storage unit 250 and display image position information acquired by the content image analysis unit 213, acquires displacement, and determines whether the display position of the reference image is normal. For example, when the acquired displacement is outside an allowable range set on the basis of displacement allowance information included in the determination information, the determination unit 214 determines that the position at which the display image is displayed is abnormal.

The determination unit 214 compares display blank space size information and expected blank space size information generated by the content image analysis unit 213 and determines whether the blank space size is normal. For example, the determination unit 214 acquires the difference between the blank space size in the display blank space size information and that in the expected blank space size information and determines that the display blank space size in the content is abnormal when the acquired difference is outside an allowable range set on the basis of the blank space size allowance information included in the determination information.

The output unit 115 outputs an error log indicating a result of determination by the determination unit 214, similar to the output unit 115 in an embodiment. This enables a tester of contents to identify the result of determination. The output unit 115 causes the log information storage unit 140 to store the error log, reads the error log from the log information storage unit 140, and outputs it in response to a request from a tester.

The source code analysis unit 221 extracts image identifying information for identifying a display image to be displayed in a content and correct text information indicating an alt display element of the display image from source code of an HTML file and causes the determination image information storage unit 151 to store the extracted image identifying information and correct text information.

The source code analysis unit 221 extracts image identifying information for identifying a display image to be displayed in a content and text information indicating text to be displayed from source code of an HTML file, similar to the source code analysis unit 121 in an embodiment. Then, the source code analysis unit 221 counts the number of characters in the text to be displayed in the content on the basis of the extracted text information, generates display character count information indicating the count, and causes the determination image information storage unit 151 to store the extracted image identifying information and the generated display character count information.

The log information storage unit 140 stores error logs indicating results of determination by the determination unit 214, similar to that in an embodiment. Examples of the error logs include abnormality of the position of a display image in a web page, mismatching between alt display elements, absence of a display image, abnormality of the display page length of a content, abnormality of the position at which a reference image is displayed, and abnormality of the display blank space size of a content.

The determination information storage unit 250 stores determination information for use in determining whether a content is correctly displayed on the basis of an HTML file, similar to the determination information storage unit 150 in an embodiment. For example, the determination image information storage unit 151 stores correct image information indicating a correct image that should be included in a content, correct image position information indicating the position at which the correct image should be displayed, image identifying information for identifying a display image, and display character count information indicating the number of characters counted by the content image analysis unit 213, similar to that in an embodiment. For example, the determination image information storage unit 151 stores reference image information indicating a reference image included in a content to be tested for disorganized layout, reference image position information indicating the position at which the reference image should be displayed, and image identifying information for use in testing the blank space size of the content.

The allowance information storage unit 152 stores page length allowance information that sets an allowable range for the page length, position allowance information that sets an allowable range for displacement between the position at which a reference image should be displayed in a content and the position at which the reference image is actually displayed, and blank space size allowance information that sets an allowable range for the blank space size being the size of blank space when the content is actually displayed on the display screen, similar to that in an embodiment.

Figure 34A:
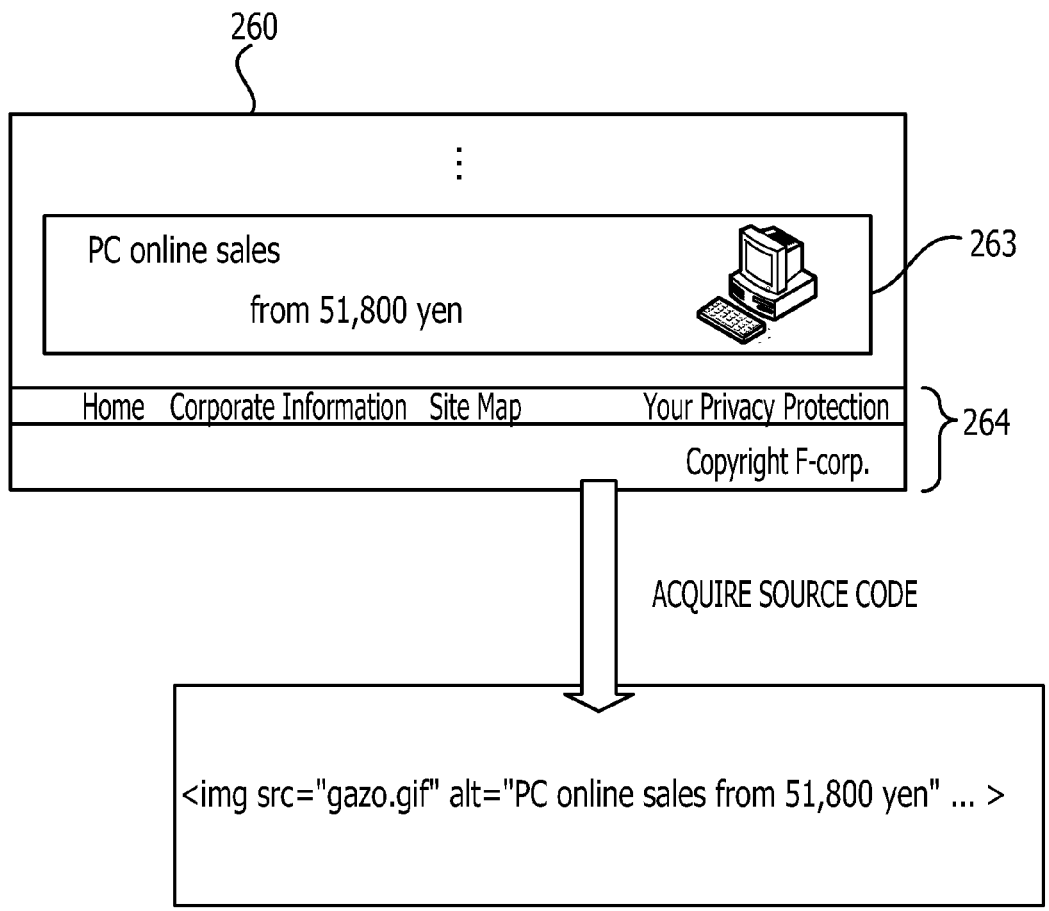
FIGS. 34A and 34B relate to test of alternative text according to an embodiment.
Figure 34B:
Figure 35:
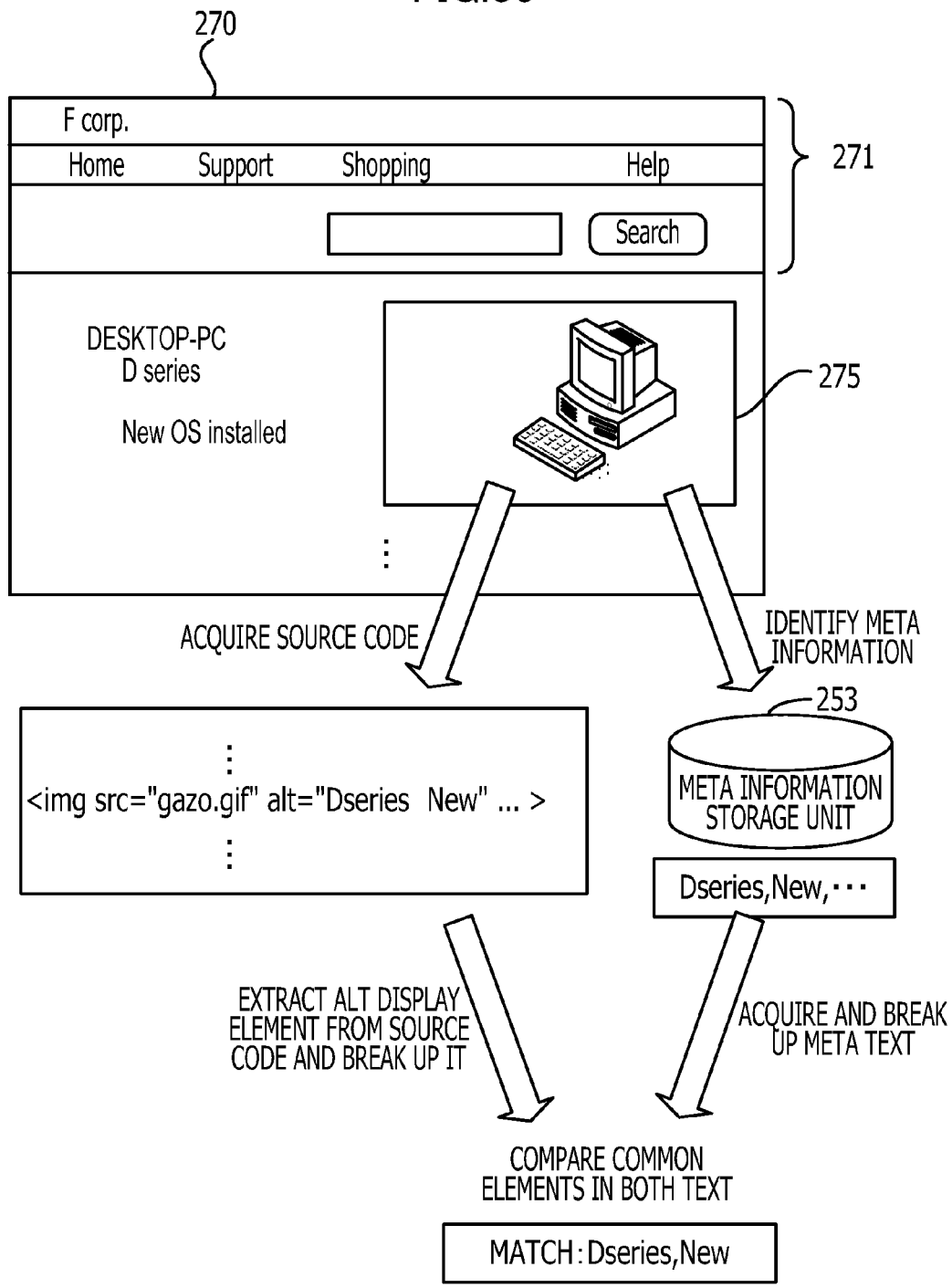
FIG. 35 relates to the test of alternative text according to an embodiment.

The meta information storage unit 253 stores meta information including meta-text information being text information relating to a display image. FIGS. 34A, 34B, and 35 relate to test of alternative text according to an embodiment. A web page 260 illustrated in FIG. 34A is a part of displaying based on an HTML file for a web page being a test-target content.

The web page 260 illustrated in FIG. 34A is a web page being a test-target content and includes a display image 263 including character information and a footer 264. The display image 263 illustrated in FIG. 34B is a display image included in the web page 260.

For the alternative text test process according to an embodiment, extraction of character information from the display image 263 illustrated in FIG. 34B is attempted by, for example, OCR, which is described below. When character information, such as "PC online sales from 51,800 yen," is extracted from the display image 263 as a result of the process of extracting character information, the extracted characters and text in the alt display element included in source code of the web page 260 are compared. In this way, with an embodiment, it is determined whether there is a match between the display image 263 and the alt display element of the display image 263.

A web page 270 illustrated in FIG. 35 includes a header 271 and a display image 275 having no character information. For the alternative text test process according to an embodiment, as described below, for example, when character information doesn't be extracted from the display image 275 as a result of the process of extracting character information with respect to the display image 275, meta information on the display image 275 stored in the meta information storage unit 253 and text of the alt display element included in source code of the web page 270 are compared. In this way, with an embodiment, it is determined whether there is a match between the display image 275 and the alt display element of the display image 275. As in the case of an embodiment, when the determination by the alternative text test process indicates that the alt display element is incorrect, an error log is output.

Figure 36:
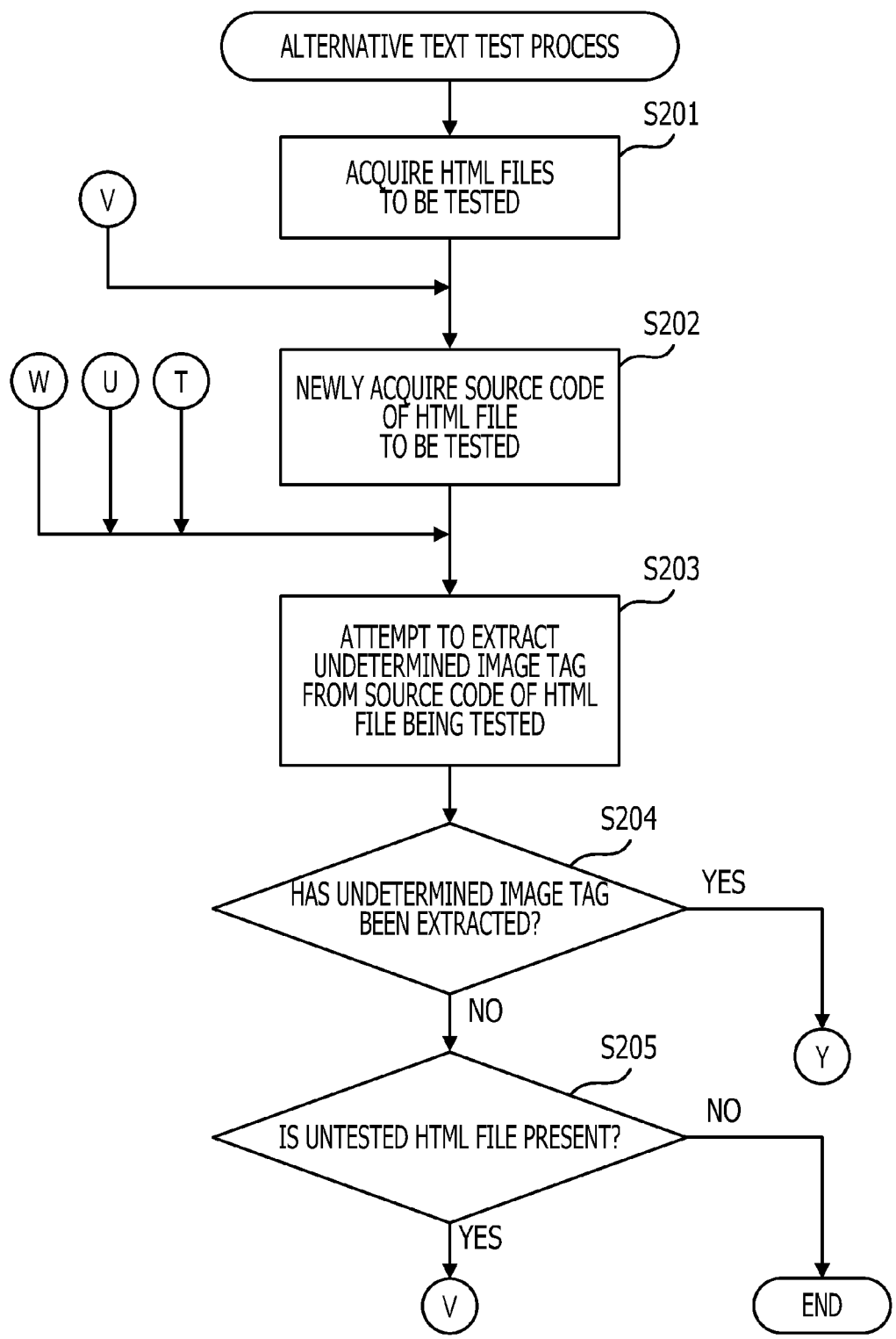
FIG. 36 is a flowchart that illustrates example operations for an alternative text test process according to an embodiment.
Figure 37:
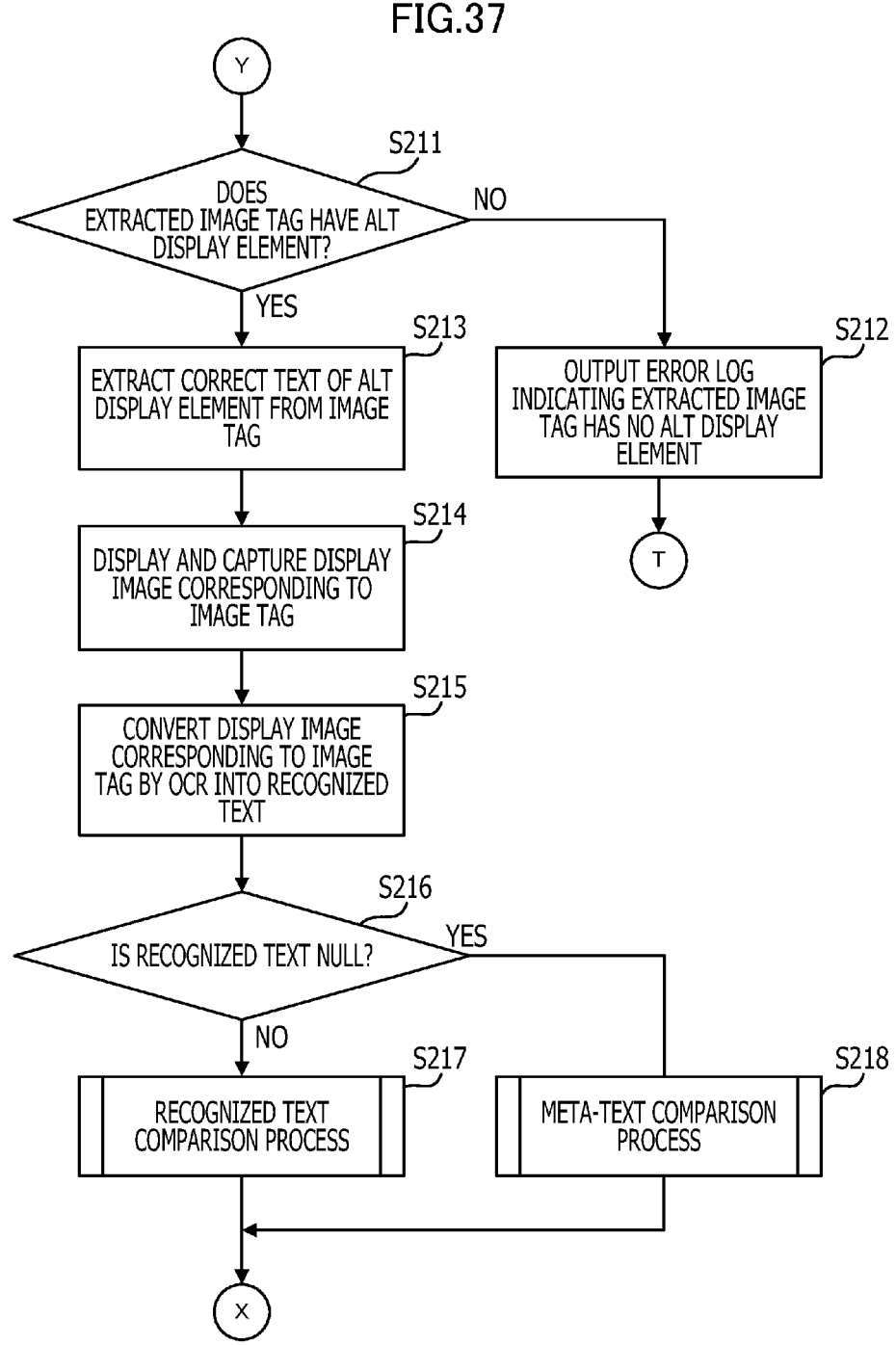
FIG. 37 is a flowchart that illustrates example operations for the alternative text test process according to an embodiment.
Figure 38:
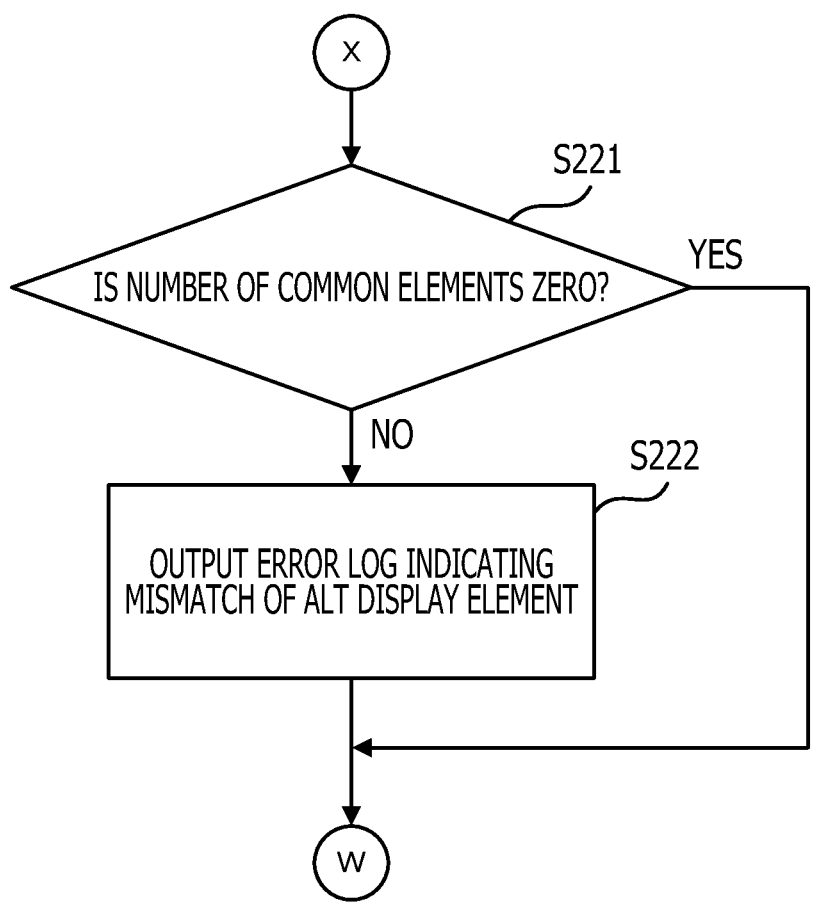
FIG. 38 is a flowchart that illustrates example operations for the alternative text test process according to an embodiment.

FIGS. 36 to 38 are flowcharts that illustrate example operations for the alternative text test process according to an embodiment. The alternative text test process illustrated in FIGS. 36 to 38 is the process of testing an alt display element of a display image displayed on the basis of an HTML file in a test-target web page, as in the case of an embodiment, the process being performed by the information processing apparatus 200. The alternative text test process is started in response to operation conducted by a tester of contents, for example.

The file acquisition unit 211 acquires data of HTML files for web pages being test-target contents (S201). The source code analysis unit 221 selects one uninspected HTML file from among the test-target web pages acquired by the file acquisition unit 211 and acquires source code thereof (S202).

The content image analysis unit 213 attempts to extract an image tag corresponding to an undetermined display image from the source code of the web page acquired by the source code analysis unit 221 (S203).

The determination unit 214 determines whether there is an image tag corresponding to an undetermined display image in the HTML file being tested (S204).

When determining that there is no image tag corresponding to an undetermined display image in the HTML file being tested (NO in S204), the determination unit 214 determines whether there is an uninspected HTML file (S205). When the determination unit 214 determines that there is an uninspected HTML file (YES in S205), the source code analysis unit 221 selects one uninspected HTML file from among the test-target web pages, as previously described, and the above-described process is performed. When the determination unit 214 determines that there is no uninspected HTML file (NO in S205), the process in an embodiment ends.

When there in an undetermined image tag in the HTML file being tested (YES in S204), the determination unit 214 determines whether there is an alt display element corresponding to that image tag (S211).

When the determination unit 214 determines that there is no alt display element corresponding to the image tag (NO in S211), the output unit 115 outputs an error log indicating that there is no image tag corresponding to the alt display element extracted from the source code of the HTML file being tested (S212). After that, the content image analysis unit 213 attempts to extract an image tag for an undetermined display image, as previously described, and the above-described process is performed.

When the determination unit 214 determines that there is an alt display element corresponding to the image tag (YES in S211), the source code analysis unit 221 extracts correct text of the alt display element from the image tag (S213). The content image creation unit 212 displays the display image corresponding to the image tag extracted by the content image analysis unit 213 from the source code of the HTML file for the web page acquired by the source code analysis unit 221. Then, the content image creation unit 212 captures the displayed display image (S214).

The content image analysis unit 213 generates recognized text in which the display image is converted by OCR (S215). The determination unit 214 determines whether the recognized text generated by the content image analysis unit 213 is null (S216).

When the determination unit 214 determines that the recognized text is not null (NO in S216), a recognized text comparison process described below is performed (S217). When the determination unit 214 determines that the recognized text is null (YES in S216), a meta-text comparison process described below is performed (S218).

The determination unit 214 determines whether the number of common elements counted in the recognized text comparison process or in the meta-text comparison process is zero (S211). When the determination unit 214 determines that the number of common elements is zero (YES in S221), the content image analysis unit 213 attempts to extract an image tag corresponding to an undetermined display image, as previously described, and the above-described process is performed.

When the determination unit 214 determines that the number of common elements is not zero (NO in S221), the output unit 115 outputs an error log indicating a mismatch of the alt display element of the display image extracted from the image tag in the source code of the test-target HTML file (S222). After that, the content image analysis unit 213 attempts to extract an image tag corresponding to an undetermined display image, as previously described, and the above-described process is performed.

Figure 39:
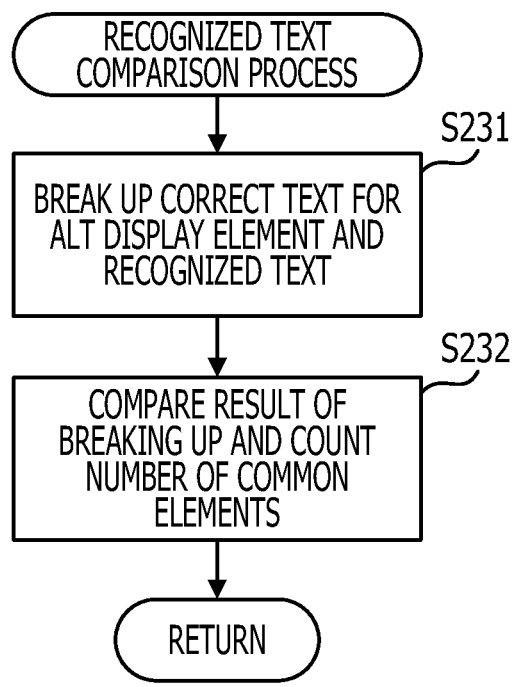
FIG. 39 is a flowchart that illustrates example operations for a recognized text comparison process according to an embodiment.

FIG. 39 is a flowchart that illustrates example operations for the recognized text comparison process according to an embodiment. The recognized text comparison process illustrated in FIG. 39 is the process of comparing text of the alt display element extracted and recognized text generated in the above-described alternative text test process. The recognized text comparison process is started by being called in the alternative text test process.

The determination unit 214 breaks up each of correct text of the alt display element extracted by the source code analysis unit 221 and recognized text generated by the content image analysis unit 213 in the alternative text test process into words (S231).

In response to a result of the breaking up, the determination unit 214 compares the correct text of the alt display element and the recognized text for each element, for example, each word or each character and counts the number of common elements commonly included in both the correct text of the alt display element and the recognized text (S232). After that, the above-described process is performed using that counted number of common elements.

Figure 40:
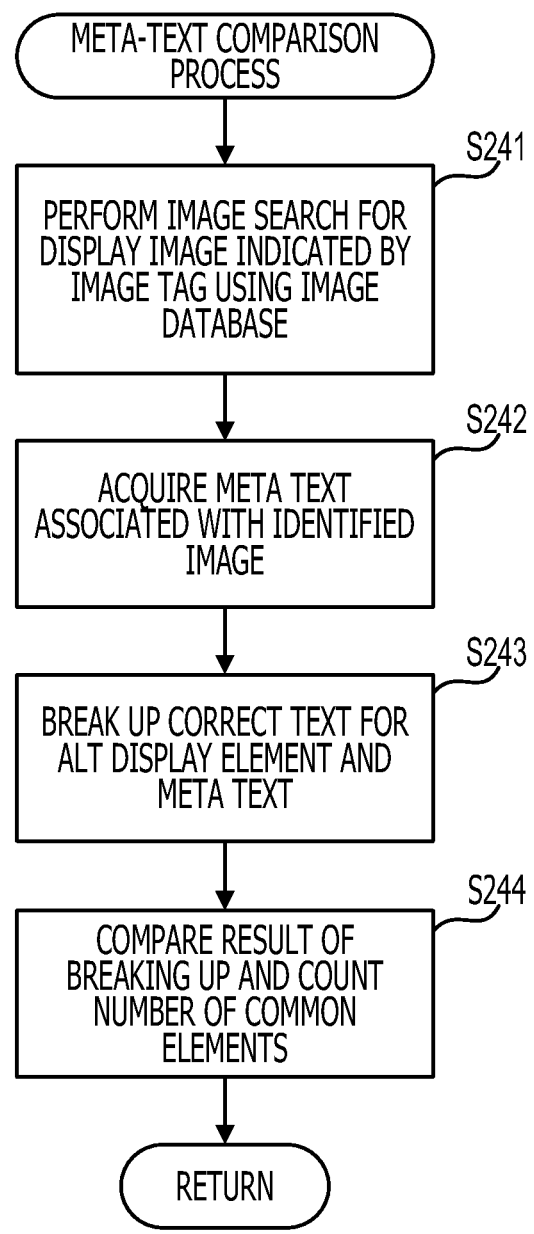
FIG. 40 is a flowchart that illustrates example operations for a meta-text comparison process according to an embodiment.

FIG. 40 is a flowchart that illustrates example operations for the meta-text comparison process according to an embodiment. The meta-text comparison process illustrated in FIG. 40 is the process of comparing text of an alt display element extracted by the above-described alternative text test process and meta text set in advance in a display image. The meta-text comparison process is started by being called in the alternative text test process.

The determination unit 214 searches an image database stored in the meta information storage unit 253 for an image using a display image indicated by an image tag (S241).

The determination unit 214 acquires meta text being text of meta information associated with an image identified by the image search from the meta information storage unit 253 (S242). This meta text is text information relating to the relevant display image. The meta text may include the title of the display image, the name of the target displayed by the display image, and information indicated by the display image (e.g., character information included in the display image), for example.

The determination unit 214 breaks up each of the acquired meta text and correct text of the alt display element extracted by the source code analysis unit 221 in the alternative text test process into words (S243).

In response to a result of the breaking up, the determination unit 214 compares the correct text of the alt display element and the meta text for each element and counts the number of common elements commonly included in both the correct text of the alt display element and the meta text (S244). After that, the above-described process is performed using that counted number of common elements.

For the above-described embodiment, when character information doesn't be extracted from a display image, meta text of meta information and correct text extracted from source code are compared. However, both meta text and correct text may be compared on all occasions, or alternatively, meta text may be used in comparison in preference to recognized text. The use of meta text included in meta information on a display image enables extraction of character information from an image by OCR to be omitted, so loads on processing is reduced.

As described above, unlike the above described embodiment, an embodiment does not need the process of displaying and capturing two kinds of images of an image of the entire page in which an alt display element is displayed and an image of the entire page in which no alt display element is displayed and extracting the difference therebetween. Thus, loads on processing is reduced.

The above processing functions are achieved by a computer. In this case, a program that describes the details of processing of the functions that the information processing apparatuses 100 and 200 should have is supplied. Executing that program by a computer enables the above processing functions to be achieved on the computer.

According to an embodiment, a computer-implemented method includes generating a file describing target characteristic of content to be displayed, creating a content image based on the file and automatically testing a display of the content by comparing the display with the content image created from the file. The automated testing, according to an embodiment, does not require manual checking or testing of elements by an operator.

A program that describes the details of processing is stored on a computer-readable storage medium. Examples of a computer-readable storage medium include a magnetic recording device, an optical disk, a magneto-optical recording medium, and semiconductor memory. Examples of a magnetic recording device include a hard disk drive (HDD), a flexible disc (FD), and magnetic tape (MT). Examples of an optical disc include a digital versatile disc (DVD), a DVD random-access memory (DVD-RAM), a compact disc read-only memory (CD-ROM), and a CD recordable and rewritable (CD-R/RW). An example of a magneto-optical recording medium is a magneto-optical disk (MO).

Further, according to an aspect of the embodiments, any combinations of the described features, functions and/or operations can be provided.

One example way of distributing the above program is selling portable storage media, such as DVDs and CD-ROMs, in which that program is stored. Another way of distribution maybe stored the program on a server computer and transfers that program from the server computer to other computers over a network.

A computer that executes the above program stores the program stored on a portable storage medium or the program transferred from a server computer in its storage device. The computer reads the program from its storage device and executes processing instructed by the program. The computer may read the program directly from a portable storage medium and execute processing instructed by that program. The computer may execute processing instructed by the received program sequentially when the program is transferred from the server computer and is stored to a storage medium such as a memory.

With a display test apparatus, a display test program, and a display test method according to the present disclosure, whether a content is correctly displayed is automatically tested, and efficiency of test of content displaying is improved.

In the foregoing, a display test apparatus, a display test program, and a display test method according to the present disclosure are described on the basis of the embodiments. The configuration of each unit may be replaced with any configuration having similar functions. Any other structures and processes may also be added to the technique of the present disclosure. The technique of the present disclosure may also be any combination of two or more configurations in the above-described embodiments.

The above description indicates merely principles of the present invention. Additionally, many modifications and changes can be made by those skilled in the art. The technique of the present disclosure is not limited to the correct configurations and applications illustrated and described above. All corresponding modification examples and equivalents are considered to be included in the scope of the accompanying claims and their equivalents of the present invention. As such, although a few embodiments have been shown and described, it would be appreciated by those skilled in the art that changes may be made in these embodiments without departing from the principles and spirit of the invention, the scope of which is defined in the claims and their equivalents.

What is claimed is:

1. A display test apparatus, comprising:
a memory; and
a processor coupled to the memory, configured to execute
storing determination information for use in determining correctness of content displaying,
acquiring a file,
creating an image of content to be displayed based on the file,
analyzing a displaying of the content based on the image of content,
determining whether the content is correctly displayed including determining whether the content is within an allowable range for displacement based on a comparison of position coordinates of the image analyzed and position coordinates associated with the determination information stored; and
outputting a result of the determining.

2. The display test apparatus according to claim 1, wherein the determination information includes a correct image information indicating a correct image that should be included in the content and a correct image position information indicating a position at which the correct image should be displayed,
the creating creates a test image based on the file so that the content is displayed on a screen,
the acquiring acquires a display image position information indicating a position of a display image that has substantially the same substance as the correct image in the test image based on the correct image information, and the determining includes determining whether the position of the display image is normal based on the correct image position information and the display image position information.

3. The display test apparatus according to claim 1, wherein the file includes a source code,
- and the processor executes extracting information indicating alternative text of the display image to be displayed in the content as correct text information from the source code, and
- wherein the creating generates an alternative text image information indicating an alternative text image based on a difference between an alternative text display image in a state where the alternative text is displayed in displaying the content and an alternative text non-display image in a state where the alternative text is not displayed in displaying the content, based on the file,
- wherein the analyzing extracts character information from the alternative text image information and generates recognized text information, and
- the determining includes comparing the correct text information and the recognized text information match and outputting a result in the outputting.

4. The display test apparatus according to claim 1, wherein the determination information includes a correct image information indicating a correct image that should be included in the content,
- the creating creates a test image based on the file so that the content is displayed on a screen,
- the analyzing extracts a display image that has substantially the same substance as the correct image in the test image based on the correct image information, and
- the determining includes determining that the display image is absent when the analyzing does not extract the display image.

5. The display test apparatus according to claim 1, wherein the file includes a source code,
- the processor executes extracting an image identifying information for identifying a display image to be displayed in the content and a text information indicating text from the source code, counting a number of characters in the text to be displayed in the content based on the text information, and generating a display character count information indicating the counted number of characters,
- wherein the creating creates a test image based on the file so that the content is displayed on a screen,
- the analyzing generates a display page length information on a measured page length of the test image and an expected page length information indicating an expected page length in displaying the content based on an image size information on a measured image size of the display image displayed based on the image identifying information and the display character count information, and
- the determining includes comparing the display page length information and the expected page length information to determine whether a display page length of the content is normal and outputting a result in the outputting.

6. The display test apparatus according to claim 5, wherein the determination information includes a page length allowance information for setting an allowable range for a page length of the content being displayed on the display screen, and
- the determining compares a difference between the page length in the display page length information and that in the expected page length information and, when the difference is outside the allowable range set based on the page length allowance information, the determination result indicates that the display page length of the content is abnormal.

7. The display test apparatus according to claim 1, wherein the determination information includes a reference image information indicating a reference image included in the content and a reference image position information indicating a position at which the reference image should be displayed,
- the creating creates a test image based on the file so that the content is displayed on a screen,
- the analyzing acquires a display image position information indicating a position of a display image that has substantially the same substance as the reference image in the test image based on the reference image information, and
- the determining includes determining whether a display position of the reference image is normal based on the reference image position information and the display image position information and outputting a result in the outputting.

8. The display test apparatus according to claim 7, wherein the determination information includes a displacement allowance information for setting the allowable range for displacement between the position at which the reference image should be displayed in the content and a position at which the reference image is actually displayed in the content, and
- the determining acquires displacement between the position in the reference image position information and that in the display image position information and, when the displacement is outside the allowable range set based on the displacement allowance information, determines that the display position of the reference image is abnormal.

9. The display test apparatus according to claim 1, wherein the file includes a source code,
- the processor executes extracting an image identifying information for identifying a display image to be displayed in the content and a text information indicating text from the source code, counting a number of characters in the text to be displayed in the content based on the text information, and generating a display character count information indicating the counted number of characters,
- wherein the creating creates a test image based on the file so that the content is displayed on a screen,
- the analyzing generates a display blank space size information on a calculated blank space size in the test image and an expected blank space size information indicating an expected blank space size in displaying the content based on an image size information on a measured image size of the display image displayed based on the image identifying information, and the display character count information, and
- the determining includes determining whether a display blank space size in the content is normal based on the display blank space size information and the expected blank space size information and outputting a result in the outputting.

10. The display test apparatus according to claim 9, wherein the determination information includes a blank space size allowance information for setting an allowable range for a blank space size being the size of a blank space in the content being displayed on the display screen, and
- the determining acquires a difference between the blank space size in the display blank space size information and that in the expected blank space size information and, when the difference is outside the allowable range set based on the blank space size allowance information, determines that the display blank space size in the content is abnormal.

11. The display test apparatus according to claim 1, wherein the file includes source code,
    the processor executes extracting an image identifying information for identifying a display image to be displayed in the content and a correct text information indicating alternative text of the display image from the source code,
    wherein the creating displays the display image specified based on the image identifying information and generates a display image information,
    the analyzing extracts a character information from the display image information and generates recognized text information, and
    the determining including comparing whether the correct text information and the recognized text information match and a result is output in the outputting based on a comparison of the correct text information and the recognized text information.

12. A display test method executable by a computer, the display test method comprising:
    acquiring a file;
    creating an image of content to be displayed based on the file;
    analyzing displaying of the content based on the image of content;
    determining, using a processor, whether the content is correctly displayed including determining whether the content is within an allowable range for displacement based on a comparison of position coordinates of the image of content analyzed and position coordinates associated with determination information stored; and outputting a result of the determining.

13. The display test method according to claim 12, wherein the creating of the content image creates a test image based on the file so that the content is displayed on a screen,
    the analyzing acquires a display image position information indicating a position of a display image that has substantially the same substance as a correct image in the test image based on correct image information, the correct image information indicating a correct image that should be included in the content and a position at which the correct image should be displayed, and
    the determining including comparing the correct image information and the display image position information are compared and a result is output in the outputting.

14. The display test method according to claim 12, wherein the file includes a source code,
    the display test method includes extracting information indicating alternative text of the display image to be displayed in the content as correct text information from the source code,
    wherein, the creating of the content image generates an alternative text image information indicating an alternative text image of the alternative text based on a difference between an alternative text display image in a state where the alternative text is displayed in displaying the content and an alternative text non-display image in a state where the alternative text is not displayed in displaying the content, based on the file,
    the analyzing extracts a character information from the alternative text image information and recognized text information is generated, and
    the determining including comparing the correct text information and the recognized text information and a result is output in the outputting.

15. The display test method according to claim 12, wherein the determination information includes a correct image information indicating a correct image that should be included in the content,
    the creating of the content image creates a test image based on the file so that the content is displayed on a screen,
    the analyzing extracts a display image that has substantially the same substance as the correct image in the test image based on the correct image information, and
    the determining includes determining that the display image is absent when the display image is extracted in the analyzing.

16. The display test method according to claim 12, wherein the file includes a source code,
    the display test method includes extracting an image identifying information for identifying a display image to be displayed in the content and a text information indicating text from the source code; and
    counting a number of characters in the text to be displayed in the content based on the text information and generating a display character count information indicating the counted number of characters,
    wherein, the creating of the content image creates a test image based on the file so that the content is displayed on a screen,
    the analyzing generates a display page length information on a measured page length of the test image and an expected page length information indicating an expected page length in displaying the content is generated based on an image size information on a measured image size of the display image displayed based on the image identifying information and the display character count information, and
    the determining including comparing the display page length information and the expected page length information to determine whether a display page length of the content is normal and a result is output in the outputting.

17. The display test method according to claim 12, wherein the determination information includes a reference image information indicating a reference image included in the content and a reference image position information indicating a position at which the reference image should be displayed,
    the creating of the content image creates a test image based on the file so that the content is displayed on a screen,
    the analyzing acquires a display image position information indicating a position of a display image that has substantially the same substance as the reference image in the test image based on the reference image information, and
    the determining includes determining whether a display position of the reference image is normal based on the reference image position information and the display image position information and a result is output in the outputting.

18. The display test method according to claim 12, wherein the file includes a source code,
    the display test method includes extracting an image identifying information for identifying a display image to be displayed in the content and a text information indicating text from the source code; and
    counting a number of characters in the text to be displayed in the content based on the text information and generating display character count information indicating the counted number of characters, wherein the creating of the content image creates a test image based on the file so that the content is displayed on a screen, the analyzing generates a display blank space size information on a calculated blank space size in the test image and an expected blank space size information indicating an expected blank space size in displaying the content is generated based on an image size information on a measured image size of the display image displayed based on the image identifying information, and the display character count information, and the determining includes determining whether a display blank space size in the content is normal based on the display blank space size information and the expected blank space size information and a result is output in the outputting.

19. A non-transitory computer-readable storage medium that stores a program causing a computer to execute an operation of a display test, comprising:

acquiring a file;

creating an image of content to be displayed based on the file;

analyzing a displaying of the content based on the image of content;

determining whether the content is correctly displayed including determining whether the content is within an allowable range for displacement based on a comparison of a position coordinates of the image of content analyzed with position coordinates associated with determination information stored; and outputting a result of the determining.

20. A computer-implemented method, comprising:

generating a file describing a target characteristic of content to be displayed;

creating a content image based on the file; and automatically testing a display of the content by comparing a position coordinates of the content image with position coordinates associated with determination information stored including determining whether the displacement is within an allowable range.

* * * * *